(12) United States Patent
Mizuta

(10) Patent No.: US 11,310,371 B2
(45) Date of Patent: Apr. 19, 2022

(54) INFORMATION PROCESSING DEVICE, LEARNING DEVICE, AND NON-TRANSITORY RECORDING MEDIUM STORING MACHINE-LEARNED MODEL

(71) Applicant: SEIKO EPSON CORPORATION, Tokyo (JP)

(72) Inventor: Masahiko Mizuta, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 9 days.

(21) Appl. No.: 16/788,450

(22) Filed: Feb. 12, 2020

(65) Prior Publication Data

US 2020/0259964 A1    Aug. 13, 2020

(30) Foreign Application Priority Data

Feb. 13, 2019  (JP) .............................. JP2019-023428

(51) Int. Cl.
| | |
|---|---|
| *H04N 1/00* | (2006.01) |
| *G06N 20/00* | (2019.01) |
| *G06F 3/12* | (2006.01) |
| *G06N 3/04* | (2006.01) |
| *G06K 9/62* | (2006.01) |

(52) U.S. Cl.
CPC ......... *H04N 1/00074* (2013.01); *G06F 3/121* (2013.01); *G06F 3/1235* (2013.01); *G06K 9/6257* (2013.01); *G06N 3/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2006/0214969 A1* | 9/2006 | Inaba ..................... | B41J 29/393 347/15 |
| 2019/0138939 A1* | 5/2019 | Devaraju ........... | G05B 23/0289 |
| 2019/0196430 A1* | 6/2019 | Seo ........................ | G06Q 10/04 |
| 2019/0306327 A1* | 10/2019 | Matysiak ................ | G06F 3/121 |
| 2020/0134373 A1* | 4/2020 | Oikawa ................ | G06F 3/1208 |

FOREIGN PATENT DOCUMENTS

| | | |
|---|---|---|
| JP | 2004-362309 | 12/2004 |
| JP | 2014-228932 | 12/2014 |
| JP | 2018-107781 | 7/2018 |
| JP | 2018-110286 | 7/2018 |
| JP | 2018-136656 | 8/2018 |

\* cited by examiner

*Primary Examiner* — Fan Zhang
(74) *Attorney, Agent, or Firm* — Workman Nydegger

(57) ABSTRACT

An information processing device includes a storage configured to store a machine-learned model, a reception section configured to receive error information and operation information transmitted from an electronic apparatus, and a processor configured to determine whether a notification indicating error information is to be made for a user. The machine-learned model mechanically learns a condition of the notification indicating error information to be made to the user based on a data set in which the error information, the operation information, and action information indicating user action performed in response to the notification of the error information are associated with one another.

7 Claims, 12 Drawing Sheets

FIG. 4

| | PRODUCT NAME | SERIAL NUMBER | COMPANY NAME | COUNTRY | REGION | VERSION |
|---|---|---|---|---|---|---|
| ☐ | ×××1 | 000001 | abc | JPA | Tokyo | 001.001 |
| ☐ | ×××1 | 000002 | def | CAN | Montreal | 001.003 |
| ☐ | ×××2 | 000003 | ghi | FRA | Paris | 002.003 |
| ⋮ | ⋮ | ⋮ | ⋮ | ⋮ | ⋮ | ⋮ |

FIG. 5

| | SERIAL NUMBER | COMPANY NAME | COUNTRY | REGION | HISTORY DATE AND TIME | ERROR ID | ERROR TYPE |
|---|---|---|---|---|---|---|---|
| + | 000001 | abc | JPA | Tokyo | 02/14/2018 15:05 | 8207 | NOZZLE CLOGGING HAS BEEN DETECTED |
| + | 000001 | abc | JPA | Tokyo | 02/14/2018 13:51 | 8207 | NOZZLE CLOGGING HAS BEEN DETECTED |
| + | 000001 | abc | JPA | Tokyo | 02/13/2018 18:05 | 1886 | ROLL END ERROR HAS OCCURRED |
| ... | ... | ... | ... | ... | ... | ... | ... |

```
NOTIFICATION OF ERROR OCCURRENCE STATE
HISTORY DATE AND TIME/SERIAL NUMBER/ERROR ID
    02/14/2018  15:05:03/000001/21
    02/13/2018  17:59:42/000001/15
    02/13/2018  06:18:51/000001/32775
    02/08/2018  06:28:08/000003/4113
```

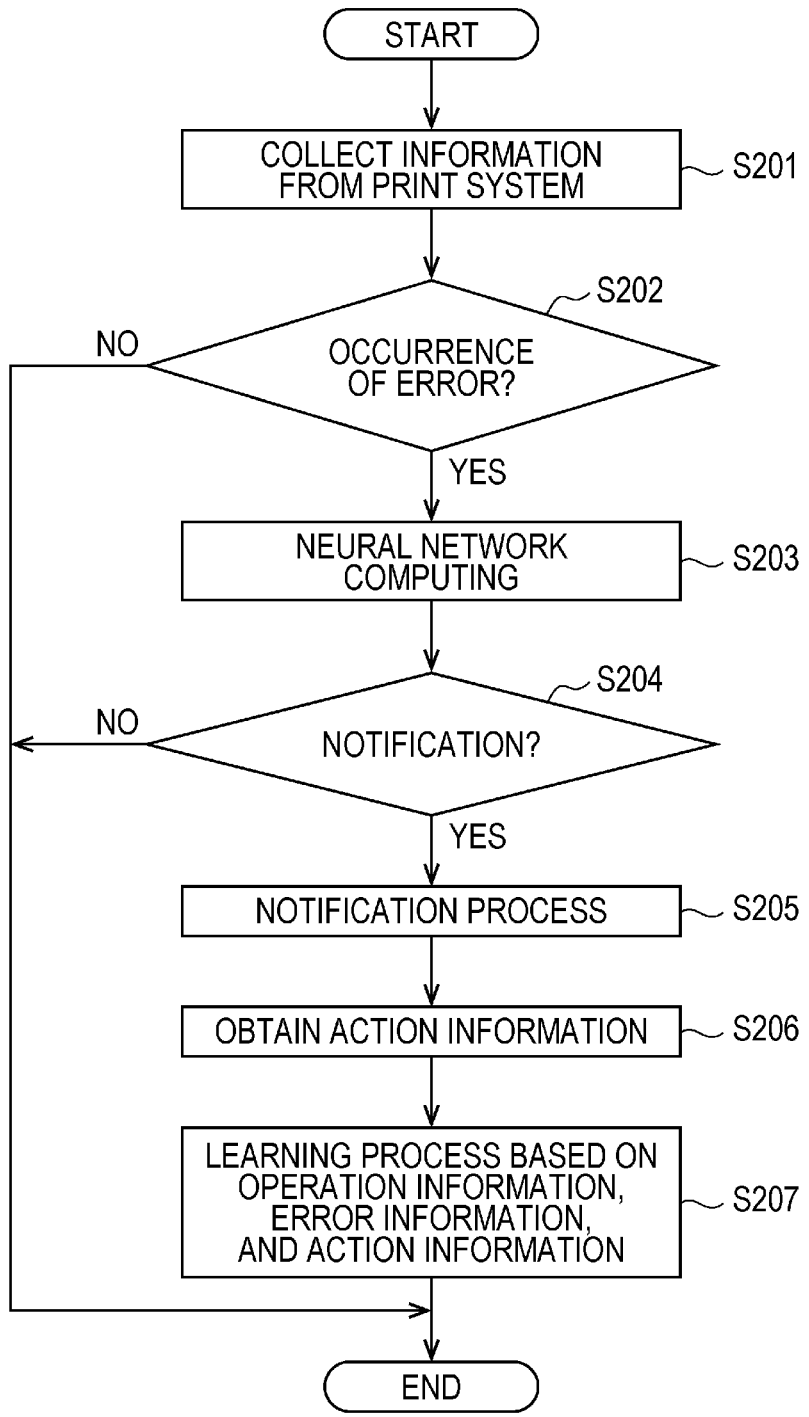

INFORMATION PROCESSING DEVICE, LEARNING DEVICE, AND NON-TRANSITORY RECORDING MEDIUM STORING MACHINE-LEARNED MODEL

The present application is based on, and claims priority from JP Application Serial Number 2019-023428, filed Feb. 13, 2019, the disclosure of which is hereby incorporated by reference herein in its entirety.

BACKGROUND

1. Technical Field

The present disclosure relates to an information processing device, a learning device, and a non-transitory recording medium storing a machine-learned model.

2. Related Art

In general, a method for notifying a user of an error when a failure, such as the error, occurs in an electronic apparatus has been used. For example, JP-A-2004-362309 discloses a method for monitoring a state of a printer and making a notification when an adverse event, such as an error, occurs in a printer.

In the method disclosed in JP-A-2004-362309, a user may set a condition and a timing of the notification. However, even when the user arbitrarily performs the settings, information of a low importance degree may be included depending on content of the notification. When a notification indicating information of a low importance degree is frequently made, the user discounts the notification, and therefore, the user is likely to miss an important notification.

SUMMARY

According to an aspect of the present disclosure, an information processing device includes a storage configured to store a machine-learned model obtained by mechanically learning a condition of a notification of error information to a user based on a data set in which the error information indicating an error generated in an electronic apparatus, operation information indicating an operation state of the electronic apparatus, and action information indicating user action performed in response to the notification of the error information are associated with one another, a reception section configured to receive the error information and the operation information transmitted from the electronic apparatus, and a processor configured to determine whether a notification indicating the error information is to be made to the user based on the machine-learned model.

BRIEF DESCRIPTION OF THE DRAWINGS

FIG. 4 is a diagram illustrating an example of a display screen used to browse information on electronic apparatuses.

FIG. 5 is a diagram illustrating an example of a display screen used to browse information on electronic apparatuses.

FIG. 15 is a flowchart of a process of performing additional learning.

DESCRIPTION OF EXEMPLARY EMBODIMENTS

An embodiment will be described hereinafter. Note that the embodiment described herein does not unreasonably limit content disclosed in claims. Furthermore, all components described in this embodiment may not be requirements.

1. Outline

As described above, a method for notifying a user of an error generated in an electronic apparatus has been used. Examples of the electronic apparatus include a printer. The examples of the electronic apparatus further include a scanner, a facsimile device, and a photocopier. The examples of the electronic apparatus further include a multifunction peripheral (MFP) having a plurality of functions, and a multifunction peripheral having a print function is also an example of a printer. The examples of the electronic apparatus further include a projector, a head-mounted display device, a wearable apparatus, a living body information measurement apparatus, such as a pulse monitor or an activity meter, a robot, a video apparatus, such as a camera, a mobile information terminal, such as a smartphone, and a physical quantity measurement apparatus.

Hereinafter, an example in which the electronic apparatus is a printer will be described. A configuration of a print system 300 including a printer will now be described in detail with reference to FIGS. 1 and 2. Thereafter, an information collecting system 400 will be described with reference to FIG. 3.

Figure 1:
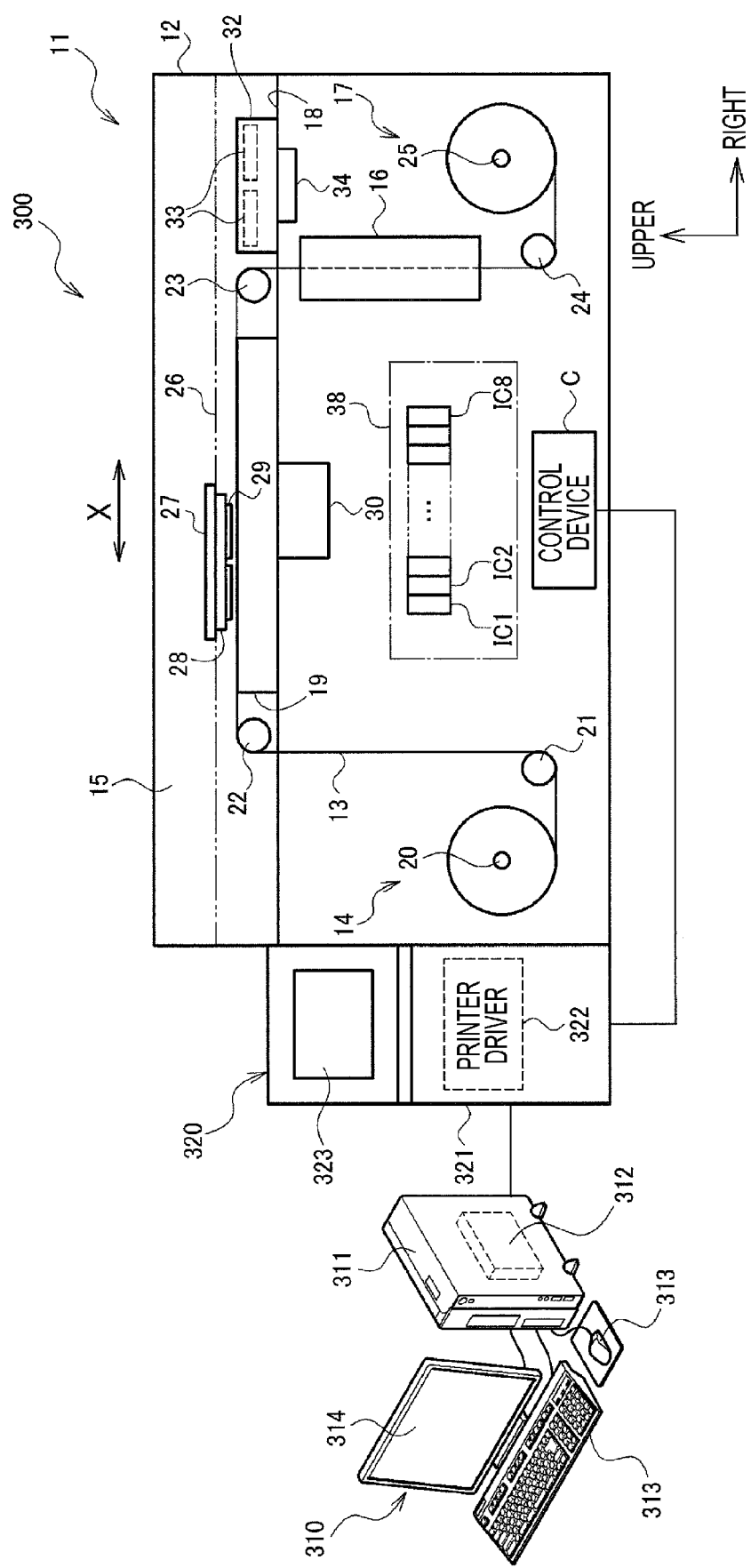
FIG. 1 is a diagram illustrating an example of a configuration of a print system.

FIG. 1 is a diagram schematically illustrating the print system 300. As illustrated in FIG. 1, the print system 300 includes an image generation apparatus 310, a host apparatus 320, and a printer 11. The printer 11 is a lateral type ink jet printer.

The image generation apparatus 310 is a personal computer (PC), for example. The image generation apparatus 310 includes an image generation section 312 realized when a central processing unit (CPU) included in a main body 311 executes image generation software. The user operates an input apparatus 313 so as to generate an image on a monitor 314 after activating the image generation section 312. Furthermore, the user instructs print of the generated image by operating the input apparatus 313. The image generation apparatus 310 transmits image data corresponding to the generated image to the host apparatus 320 through a predetermined communication interface based on the instruction.

The host apparatus 320 is a PC, for example, and includes a printer driver 322 realized when a CPU included in a main body 321 executes printer driver software. The printer driver 322 generates print data based on the image data supplied from the image generation apparatus 310 and transmits the generated print data to a control device C mounted on the printer 11. The control device C controls the printer 11 based on the print data supplied from the printer driver 322 and causes the printer 11 to print an image based on the print data. Note that a menu screen used to input and set setting values for control to the printer 11, an image to be printed, and the like are displayed in a monitor 323.

Next, a configuration of the printer 11 illustrated in FIG. 1 will be described. Note that a "left-right direction" and an "upper-lower direction" in a description in the specification below are described based on directions denoted by arrow marks in FIG. 1. Furthermore, a near side is referred to as a front side and a far side is referred to as a back side in FIG. 1.

As illustrated in FIG. 1, the printer 11 includes a cuboid body case 12. The body case 12 includes a unreeling section 14 which unreels a long sheet 13, a print chamber 15 which performs printing on the sheet 13 by ejecting ink, a drying device 16 which performs a drying process on the sheet 13 to which the ink is attached by the printing, and a reeling section 17 which reels the sheet 13 which has been subjected to the drying process.

A flat plate base 18 which separates the body case 12 into an upper side and a lower side is disposed in an upper portion relative to a center of the body case 12. An upper region relative to the base 18 is the print chamber 15 including a support member 19 of a rectangle bar shape supported on the base 18. A lower region relative to the base 18 includes the unreeling section 14 on a left side which is an upstream in a direction in which the sheet 13 is transported and the drying device 16 and the reeling section 17 on a right side which is a downstream.

As illustrated in FIG. 1, the unreeling section 14 includes a winding shaft 20 extending in a front-back direction in a rotatable manner, and the sheet 13 is supported by the winding shaft 20 in an integrally rotatable manner in a state in which the sheet 13 is wound as a roll. The sheet 13 is unreeled from the unreeling section 14 when the winding shaft 20 rotates. Furthermore, the sheet 13 unreeled from the unreeling section 14 is hung on a first roller 21 disposed on a right side of the winding shaft 20.

On the other hand, a second roller 22 is disposed in a position on a left side of the support member 19 and corresponding to the first roller 21 disposed on a lower side of the second roller 22 in the vertical direction. The second roller 22 is disposed in parallel to the first roller 21. Then the sheet 13 transported in a vertically upward direction by the first roller 21 is hung on the second roller 22 from a lower left portion of the second roller 22 so that the transport direction of the sheet 13 is changed to a horizontally rightward direction and the sheet 13 slides on an upper surface of the support member 19.

Furthermore, a third roller 23 which faces the second roller 22 on the left side with the support member 19 interposed therebetween is disposed on a right side of the support member 19 in parallel to the second roller 22. Note that positions of the second roller 22 and the third roller 23 are adjusted such that top portions of peripheries of the second roller 22 and the third roller 23 are the same as a top surface of the support member 19 in height.

The sheet 13 which has been transported rightward in the horizontal direction by the second roller 22 disposed on the left side in the print chamber 15 is transported to the right side which is the downstream while sliding the upper surface of the support member 19, and thereafter, the sheet 13 is hung on the third roller 23 from an upper right side so that a transport direction is changed to a vertically downward direction so as to be transported to the drying device 16 disposed on the lower side relative to the base 18. Thereafter, the sheet 13 which has been subjected to the drying process in the drying device 16 is further transported downward in the vertical direction, and hung on a fourth roller 24 so that the transport direction is changed to a horizontally right direction. Thereafter, the sheet 13 is reeled in a roll shape when a winding shaft 25 of the reeling section 17 disposed on a right side of the fourth roller 24 is rotated. The winding shaft 25 is rotated by driving forth of a transport motor not illustrated.

As illustrated in FIG. 1, guide rails 26 extending in the horizontal direction are included in the print chamber 15. The guide rails 26 are disposed on front and back sides of the support member 19 in the print chamber 15 as a pair. Upper surfaces of the guide rails 26 are higher than the upper surface of the support member 19. A rectangle carriage 27 is supported on the upper surfaces of the guide rails 26 in a state in which the rectangle carriage 27 is available for reciprocation in a main scanning direction X illustrated in FIG. 1 along the guide rails 26 in accordance with driving of first and second carriage motors. A plurality of heads 29 are supported on a lower surface of the rectangle carriage 27 through a support plate 28.

A certain range from a left end to a right end of the support member 19 is determined as a print region, and the sheet 13 is intermittently transported in a unit of print region. Printing is performed on the sheet 13 when ink is ejected from the print heads 29 in accordance with reciprocation of the carriage 27 relative to the sheet 13 stopped on the support member 19.

Note that, when the printing is performed, a suction device 30 disposed beneath the support member 19 is driven so that the sheet 13 is sucked on the upper surface of the support member 19 by sucking force caused by negative pressure applied over a large number of sucking holes which are opened on the upper surface of the support member 19. After the one printing operation on the sheet 13 is terminated, the negative pressure of the suction device 30 is released and the sheet 13 is transported.

Furthermore, a maintenance device 32 for performing maintenance on the heads 29 at the time of printing is disposed in a non-printing region on a right side relative to the third roller 23 in the print chamber 15. The maintenance device 32 includes caps 33 for individual recording heads 29 and a lifting device 34. The caps 33 move between a capping position where the caps 33 abut on nozzle forming surfaces 35 of the recording heads 29 and a retracting position where the caps 33 are separated from the nozzle forming surfaces 35 when the lifting device 34 is driven. The nozzle forming surfaces 35 will be described with reference to FIG. 2.

Furthermore, as illustrated in FIG. 1, a plurality of ink cartridges IC1 to IC8 which accommodate different colors of ink are installed in the body case 12 in a detachable manner. Note that the number of ink cartridges is not limited to eight. The ink cartridges IC1 to IC8 are coupled to the recording heads 29 through ink supply paths, and the individual recording heads 29 eject the ink supplied from the corresponding ink cartridges IC1 to IC8. The ink supply paths will be described hereinafter with reference to FIG. 2. The printer 11 illustrated in FIG. 1 is capable of performing color printing using eight color inks. Note that opening/closing covers 38 are disposed in portions corresponding to portions of the ink cartridges IC1 to IC8 in the body case 12. The ink cartridges IC1 to IC8 are replaced by opening the covers 38.

The eight ink cartridges IC1 to IC8 accommodate inks of black, cyan, magenta, yellow, and so on, for example. Note that a moisture liquid cartridge which accommodates moisture liquid may be attached. Types of ink and the number of colors of ink may be appropriately set. Only black ink may be used as monochrome printing, only two colors of ink may be used, or an arbitrary number of colors of ink which is three or more colors and which is other than eight colors may be used.

The individual ink cartridges IC1 to IC8 are electrically coupled to the control device C through cartridge holders, not illustrated, and information on amounts of remaining inks of the corresponding colors are written in nonvolatile storage elements implemented in the ink cartridges IC1 to IC8.

Figure 2:
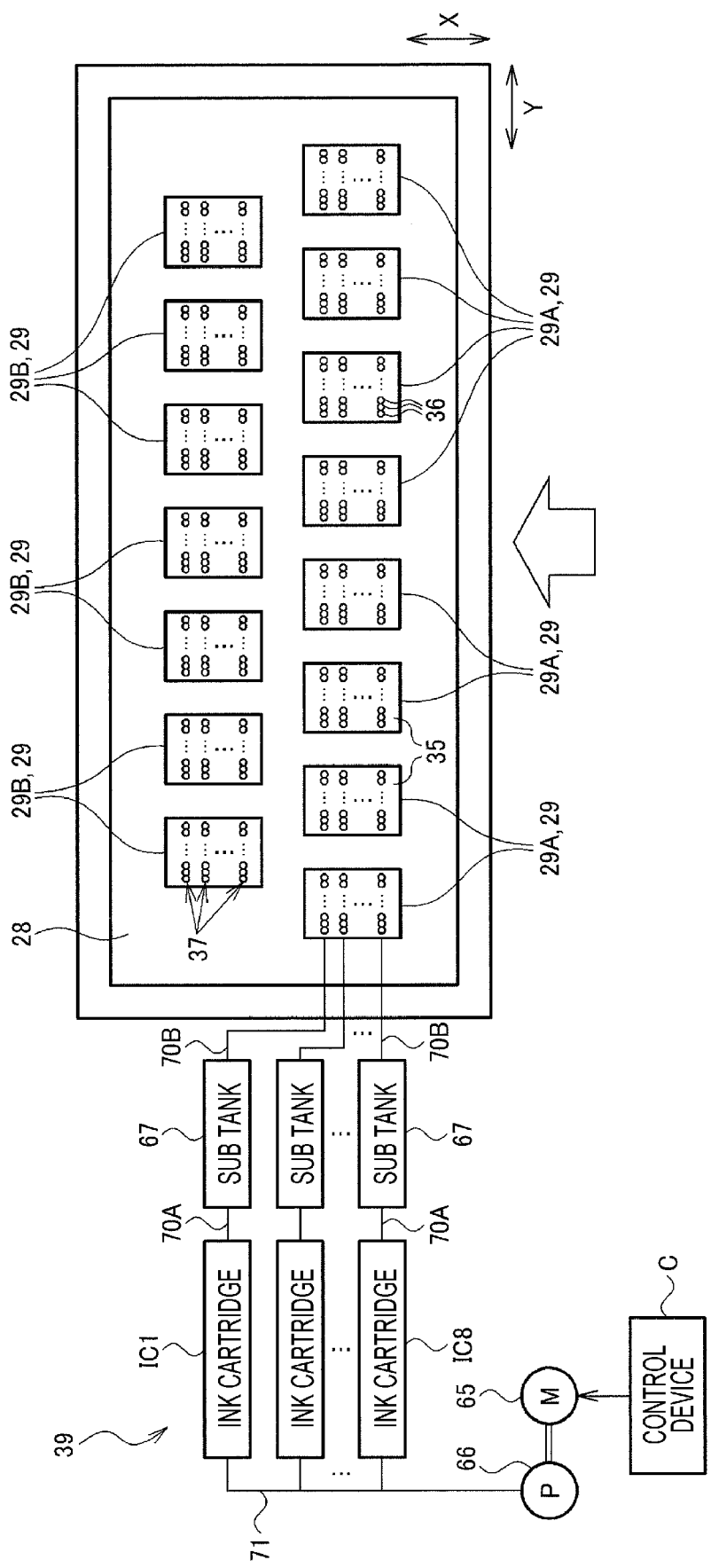
FIG. 2 is a diagram illustrating examples of configurations of recording heads and an ink supply device.

FIG. 2 is a diagram schematically illustrating the plurality of recording heads 29 disposed on a bottom surface of the carriage 27 and an ink supply device 39 which supplies ink to the individual recording heads 29. As illustrated in FIG. 2, the plurality of recording heads 29 are supported by the support plate 28 which is supported on a lower surface of the carriage 27 such that the recording heads 29 are arranged in a zig-zag pattern in a width direction which is orthogonal to a transport direction of the sheet 13. Specifically, recording heads 29A and recording heads 29B which are 15 recording heads 29 in total are arranged in respective two lines at a regular pitch in a sub-scanning direction Y while being shifted from each other by a half pitch in the sub-scanning direction Y. Then a plurality of nozzle lines 37 are formed in a main-scanning direction X with a certain interval on the nozzle forming surfaces 35 which are lower surfaces of the recording heads 29. Each of the nozzle lines 37 includes a plurality of nozzles 36 arranged in a line in the sub-scanning direction Y. Although eight nozzle lines 37 are arranged, for example, the number of nozzle lines is not limited to this.

As illustrated in FIG. 2, the printer 11 includes an ink supply device 39 which supplies inks of the various colors to the individual recording heads 29. The ink supply device 39 includes a pump motor 65, a pressure pump 66, the ink cartridges IC1 to IC8, and sub-tanks 67.

When being attached to the cartridge holders, the ink cartridges IC1 to IC8 are coupled to the corresponding sub-tanks 67 through ink supply paths 70A, and the sub-tanks 67 are further coupled to the recording heads 29 through ink supply paths 70B. The ink supply paths 70A and the ink supply paths 70B are tubes, for example. Note that only the coupling relationship between the plurality of sub-tanks 67 and one of the recording heads 29 is illustrated in FIG. 2. A number of ink supply paths 70B corresponding to the number of recording heads 29 extend from each of the sub-tanks 67, and the ink supply paths 70B extending from each of the sub-tanks 67 are coupled to the corresponding recording heads 29.

Furthermore, the ink cartridges IC1 to IC8 are coupled to a discharge port of the pressure pump 66 through an air supply path 71 in a state in which the ink cartridges IC1 to IC8 are attached to the cartridge holders. When a control device C drives the pump motor 65 so as to drive the pressure pump 66, pressurized air discharged from the pressure pump 66 is supplied to the ink cartridges IC1 to IC8 through the air supply path 71.

An ink pack is accommodated in each of the ink cartridges IC. When the ink pack is pressurized by the pressurized air supplied to the ink cartridge IC through the air supply path 71, ink is supplied from the ink cartridge IC to a corresponding one of the ink supply paths 70A in a pressurized manner. The ink supplied from the ink cartridges IC are supplied to the sub-tanks 67 through the respective ink supply paths 70A and further supplied to the recording heads 29 from the sub-tanks 67 through the ink supply paths 70B.

Figure 3:
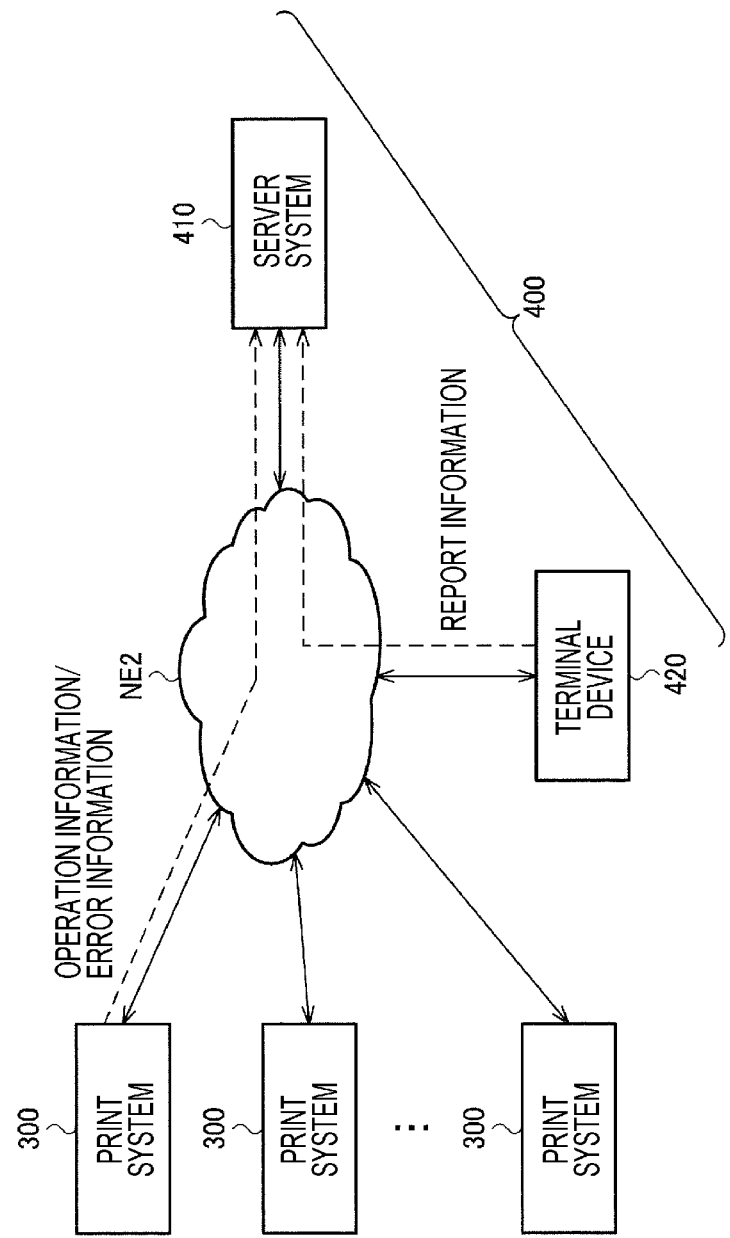
FIG. 3 is a diagram illustrating an example of a configuration of a system including an information collecting system.

FIG. 3 is a diagram schematically illustrating the information collecting system 400. The print system 300 is configured in facility of a company which has purchased the printer 11, for example, and is described above with reference to FIG. 1 in detail. Note that the print system 300 illustrated in FIG. 1 includes one printer 11 and one image generation apparatus 310. However, the print system 300 may include a plurality of printers 11 and a single image generation apparatus 310 which is shared by the plurality of printers 11. As illustrated in FIG. 3, the number of the print systems 300 is not limited to one and a plurality of print systems 300 may be used. Furthermore, a configuration of a system including the information collecting system 400 is not limited to that illustrated in FIG. 3, and various modifications may be made such that some of the components are omitted or other components are added, for example.

The print system 300 collects error information and operation information of the printer 11. The error information is associated with an error which occurs in the printer 11. Examples of the error which occurs in the printer 11 include ejection failure of heads, liquid leakage, a motor error, and a substrate error. The ejection failure is also referred to as clogging of the nozzles 36 included in the recording heads 29. The liquid leakage is specifically leakage of ink. The error information includes information specifying a type of generated error and information representing a date and time of occurrence of an error. The printer 11 includes a detection plate and a sensor which detects whether ink has been ejected to the detection plate. The printer 11 outputs error information indicating ejection failure based on an output of the sensor. When the recording heads 29 eject ink using piezoelectric elements, different waveforms of current are generally supplied to the piezoelectric elements in different examples, that is, an example in which ink is appropriately ejected and an example in which ink is not appropriately ejected. Therefore, the printer 11 may output error information indicating ejection failure based on a waveform current. Furthermore, the printer 11 includes a liquid leakage detection sensor which outputs error information indicating liquid leakage based on an output of the liquid leakage detection sensor. Various methods for detecting error information in the printer 11 are generally used and are widely applicable in this embodiment.

The operation information indicates an operation state of the printer 11. Examples of the operation information include job history information indicating a history of print jobs which have been executed, event history information indicating a history of events generated in the printer 11, ink consumption amount information, print amount information, nozzle information, and information on lifetimes of consumables.

The print job is data corresponding to one printing operation performed by the printer 11. The job history information is time-series data obtained by associating information on an executed print job and information on a date and time of the execution with each other. The information indicating a print job includes a job ID, information specifying image data to be printed, and the like. The information specifying image data may be image data itself, data indicating a thumbnail image, information on a file name, or the like.

Events are generated in the printer 11, such as nozzle check, cleaning, and flushing. The event history information is time-series data obtained by associating information on a generated event and information on a date and time of the generation with each other.

The ink consumption amount information indicates an amount of ink consumed by printing performed by the printer 11. The ink consumption amount is obtained by multiplying the number of times ink is ejected from the nozzles 36 of the recording heads 29 by an amount of ink used for the single ejection operation, for example. Furthermore, the printer 11 includes a sensor for detection of an ink amount, and an ink consumption amount may be calculated based on an output of the sensor.

The print amount information indicates an amount of printing medium consumed by the printing performed by the printer 11. When a printing medium is the rolled sheet 13 as described above, for example, the print amount information indicates a length of the sheet 13 used for the printing. Note that the print amount information may be information indicating an area of a printing medium used for the printing or information indicating the number of printing media.

The information on lifetimes of consumables indicates degrees of use of consumables. Here, the consumables are maintenance components or replaceable components included in the printer 11 which are preferably replaced in a periodic manner. Examples of the consumables include various components, such as print heads, flow path filters, tubes, a transport motor, and a carriage motor. The print heads are specifically the recording heads 29. The tubes are specifically the ink supply paths 70A and 70B. The tubes may include discharge liquid tubes which discharge ink to discharge liquid tanks. The flow path filters remove foreign matters contaminated in the ink supply paths 70A and 70B. The components have upper limits of use amounts so as to be designed for good predetermined performance. Here, the use amounts may be use times or the number of times the components are used. Furthermore, the use amounts may be movement amounts or rotation amounts for movable components such as a motor. The use times of consumables may be a period of time in which the printer 11 is in active or a period of time in which a print job is executed, for example. Furthermore, use amounts of individual consumables may be counted by different methods, and various modifications may be made as concrete methods for obtaining use amounts. The information on lifetimes of consumables indicates rates of actual use amounts to upper limits of use amounts of target consumables, for example.

The information collecting system 400 includes a server system 410 and a terminal device 420. The server system 410 and the terminal device 420 are connected to a network NE2 and may be communicated with each other through the network NE2 in a bidirectional manner. The network NE2 is a public communication network, such as the Internet. Note that the server system 410 and the terminal device 420 may be connected to each other through a private network, not illustrated, which is different from the network NE2 which is a public communication network. Examples of the private network include intranets in companies, for example.

The print system 300 and the server system 410 are connected to the network NE2 and may be communicated with each other through the network NE2 in a bidirectional manner. The server system 410 collects error information and operation information of the printer 11 from the print system 300 through the network NE2. For example, the image generation apparatus 310 performs a process of collecting error information and operation information from the printer 11 and a process of transmitting the collected error information and the collected operation information to the server system 410. Note that the printer 11 or the host apparatus 320 may perform the collecting process or the transmitting process.

Furthermore, the terminal device 420 is a terminal used by a service person who performs maintenance or repair of the printer 11, for example. The terminal device 420 may be a personal computer (PC) or a mobile terminal apparatus, such as a tablet terminal. When performing a countermeasure, such as repair or inspection, on the printer 11 of which the service person is in charge, the service person generates report information on the countermeasure. The terminal device 420 transmits the report information generated by the service person to the server system 410.

The report information include, for example, information specifying the printer 11 subjected to the countermeasure, the error information output from the printer 11, information indicating the countermeasure performed by the service person, and information indicating a result of the countermeasure. The information specifying the printer 11 includes a printer ID uniquely specifying the printer 11, information on a model of the printer 11, and version information of firmware of the printer 11. The printer ID is a serial number described below, for example. The error information is output from the printer 11 before the countermeasure. The report information may include, in addition to the error information, information on a trouble reported by a customer using the printer 11. The trouble includes a blur or bleeding of a result of printing and a color which is different from a set color which are recognized by the customer. Examples of the information on a countermeasure include information indicating replacement of consumables and information on thorough cleaning which is performed by the service person. The result of countermeasure is information indicating whether restoration to a normal state is attained by the countermeasure.

Note that a plurality of terminal devices 420 may be used. For example, different service persons perform maintenance of different printers 11. The different service persons generate and transmit report information using different terminal devices 420. Alternatively, a single service person may use a plurality of terminal devices 420.

As described above, the server system 410 accumulates information on the printer 11 by collecting the error information, the operation information, and the report information. The server system 410 performs processing on the collected information and transmits the processed information to the print system 300 and the terminal device 420. Examples of the processing include a process of extracting specific information, a statistical process, and a process of generating a graph. Note that the transmission of information from the server system 410 may be performed as a response to a request transmitted from the print system 300 or the terminal device 420 or may be performed by push notification.

The server system 410 generates information for a customer which is useful when the customer uses the printer 11, such as ink use amount data in time-series and information on a history of executed jobs and transmits the information for a customer to the print system 300. The transmitted information for a customer is displayed in the monitor 314 of the image generation apparatus 310 or the monitor 323 of the host apparatus 320, for example. Furthermore, the apparatus which receives the information for a customer is not limited to the apparatus included in the print system 300 and may be another apparatus used by the customer.

Furthermore, the server system 410 generates information for a service person which is useful for the service person maintaining the printer 11, such as an error occurrence history, information indicating lifetimes of consumables, and a repair history, and transmits the information for a service person to the terminal device 420. Note that the information for a customer and the information for a service person may include the same information. Furthermore, a terminal which receives the information for a service person is not limited to the terminal device 420 and may be another terminal device used by a service person. In other words, the terminal which transmits the report information to the server system 410 and the terminal which receives the information for a service person may be the same or may be different.

For example, the server system 410 transmits the collected error information to the terminal device 420. An example of a screen for browsing the error information in the terminal device 420 will be described with reference to FIGS. 4 to 6.

FIG. 4 is a diagram illustrating an example of a display screen for browsing information on the printer 11, and specifically, an example of a home screen. For example, the server system 410 includes a database server which stores the error information, the operation information, and the report information and a web application server. The web application server obtains required information from the database server based on a request transmitted from the terminal device 420 and transmits a HyperText Markup Language (HTML) file including the error information and the operation information as a response. FIG. 4 and FIG. 5 described hereinafter illustrate screens displayed using a web browser operating in the terminal device 420, for example.

As illustrated in FIG. 4, the information displayed in the home screen includes a product name of the printer 11, a serial number, a company name, a country, a region, and a version. The product name indicates a model number of the printer 11. The serial number indicates an ID which uniquely identifies the printer 11. The company name indicates a name of a company of a customer. The country and the region indicate a place where the target printer 11 operates. The version indicates a version of firmware of the printer 11. Use of the screen in FIG. 4 enables the service person to recognize the information on the printers 11 installed all over the world in a mode of high listing property.

FIG. 5 is a diagram illustrating an example of a display screen for browsing the error information associated with a given printer 11. For example, when an operation of selecting the given printer 11 and an operation of instructing display of error information are performed in the screen illustrated in FIG. 4, the display is changed to the screen illustrated in FIG. 5. Note that the operation of selecting the printer 11 is performed in the screen illustrated in FIG. 4 by pressing a selection button, not illustrated, after checking one of checkboxes in a left end in FIG. 4, for example. Only a single printer 11 may be selected or a plurality of printers 11 may be selected.

As illustrated in FIG. 5, the information displayed in an error screen includes a serial number, a company name, a country, a region, a history date and time, an error ID, and an error type. The serial number, the company name, the country, and the region are the same as those in FIG. 4. The history date and time indicates information on a date and time when an error has occurred. The error ID specifies a generated error. The error type is text information indicating a generated error. The use of the screen illustrated in FIG. 5 enables the service person to recognize a type of an error and a timing when the error has occurred in the printer 11 in which the service person takes charge of maintenance.

Figures 6, 7:
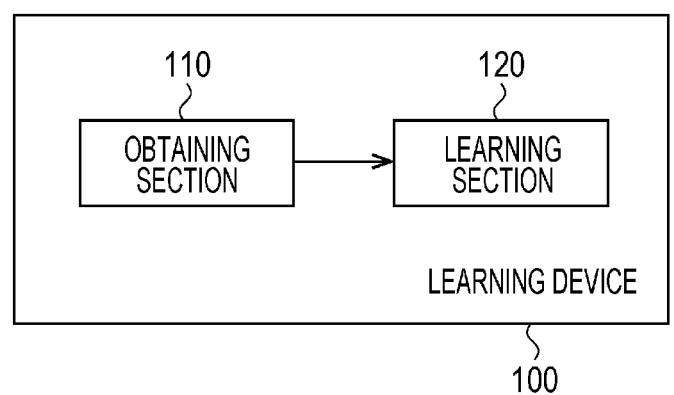
FIG. 6 is a diagram illustrating an example of an error notification.
FIG. 7 is a diagram illustrating an example of a configuration of a learning device.

FIG. 6 is a diagram illustrating a portion of an error notification mail transmitted to the terminal device 420 used by the service person. As illustrated in FIG. 6, the error notification mail includes a history date and time, a serial number, and an error ID. Content of the information is the same as that in FIG. 5. In the general methods, the server system 410 transmits the error notification mail including the content illustrated in FIG. 6 to the terminal device 420 every predetermined period, for example. The information included in the error notification mail is associated with an error which has occurred in the predetermined period. The predetermined period corresponds to approximately several hours or one day, for example. Furthermore, although the example in which the error notification mail is used is described in this embodiment, the server system 410 may transmit the information illustrated in FIG. 6 to the terminal device 420 using another push notification method.

When the screen illustrated in FIG. 5 is used, the service person actively obtains error information. Specifically, the service person actively executes an operation of displaying the error screen using the operation section of the terminal device 420. When the error notification mail illustrated in FIG. 6 is used, the service person passively obtains the error information. By any method, the server system 410 may prompt the service person to perform a countermeasure by transmitting the error information to the terminal device 420.

In particular, in the industrial printer illustrated in FIGS. 1 and 2, when the operation of the printer 11 is stopped due to an error, and therefore, a downtime is generated, production of a product is stopped. The generation of a downtime results in deterioration of productivity, and therefore, a countermeasure for suppressing the generation of downtime is considerably important. In other words, it is important to prompt the service person to perform an appropriate countermeasure by notifying the service person of a serious error which causes the generation of downtime as quick as possible.

However, in the general methods, it is difficult to cause the service person to appropriately obtain error information. For example, as illustrated in FIG. 5, a complex process is performed to extract required information before error information is actively obtained. When the server system 410 collects information from a large number of printers 11, for example, the service person performs an operation of appropriately selecting the printers 11 of which the service person is in charge. Furthermore, errors may have high importance degree or low importance degree, and therefore, the service person narrows down errors to be focused. It is not easy for the service person to visually narrow down errors using the screen of FIG. 5, and an operation for filtering is required when filtering is performed according to an error ID or the like.

On the other hand, as illustrated in FIG. 6, when the method for passively obtaining information is employed, the complex process to be performed to obtain information may be reduced. For example, the service person sets a type of error information to be obtained in a display screen, not illustrated. For example, the service person sets an error ID to be obtained in the terminal device 420. Then the server system 410 notifies the terminal device 420 of error information corresponding to content of the setting by push notification.

However, when such a setting is performed, a notification of error information of a low importance degree may be made. For example, the error of the ejection failure may be a light error to be resolved by automatic cleaning or automatic flushing or may be a serious error which requires head replacement or the like. When the filtering using an error ID is employed, these errors may not be distinguished from each other. When a notification of error information of a low importance degree is frequently made, an error notification mail is not efficiently utilized, and therefore, the service person may miss important information.

Therefore, in this embodiment, a condition for a determination as to whether a notification of error information is to be made is mechanically learnt. By this, a notification condition is automatically learnt, and therefore, a notification indicating appropriate error information may be made to the user, that is, the service person. For example, degrees of importance of errors may be individually determined using various operation information as input data even when the errors are the same type, and therefore, an appropriate notification indicating important error information may be performed.

Furthermore, in the foregoing description, the example in which the user to which the notification indicating error information is to be transmitted is the service person who takes in charge of maintenance of the electronic apparatus is described. However, a target of the notification indicating error information may be a customer, that is, a user of the electronic apparatus. Hereinafter, an example in which a notification of generation of an error is made for a user who is a service person by transmitting error information to the terminal device 420 will be described. Note that the term "user" described below may be replaced by a "user who is a customer" where appropriate. Furthermore, a transmission destination of the error information is not limited to the terminal device 420 and may be the print system 300 used by the customer or an apparatus, not illustrated.

Hereinafter, a learning process and an estimation process of this embodiment will be individually described. The learning process obtains a learning result by performing machine learning based on training data. The learning result is specifically a machine-learned model. The estimation process outputs an estimation result of some sort based on an input using the machine-learned model generated by the learning process. Furthermore, a method for updating the machine-learned model based on a result of the estimation process will also be described.

2. Learning Process 2.1 Example of Configuration of Learning Device

FIG. 7 is a diagram illustrating an example of a configuration of a learning device 100 of this embodiment. The learning device 100 includes an obtaining section 110 which obtains training data used for leaning and a learning section 120 which performs machine learning based on the training data.

The learning device 100 illustrated in FIG. 7 is included in the server system 410 of FIG. 3, for example. Specifically, the server system 410 performs a process of obtaining training data from the print system 300 and the terminal device 420 and a process of performing machine learning based on the training data. Note that the learning device 100 may be included in an apparatus except for the server system 410. For example, the learning device 100 is included in an apparatus coupled to the server system 410 through the network NE2. The apparatus obtains training data collected by the server system 410 through the network NE2 and performs machine learning based on the training data. Alternatively, the learning device 100 may obtain training data from the server system 410 through another apparatus. Alternatively, training data may be accumulated in a system other than the information collecting system 400 of FIG. 3.

The obtaining section 110 is a communication interface which obtains training data from another device, for example. Alternatively, the obtaining section 110 may obtain training data stored in the learning device 100. For example, the learning device 100 includes a storage section, not illustrated, and the obtaining section 110 is an interface for reading training data from the storage section. The learning in this embodiment is supervised learning, for example. The training data in the supervised learning is a data set in which input data and a correct label are associated with each other. The correct label may be reworded as supervised data.

The learning section 120 performs machine learning based on training data obtained by the obtaining section 110 so as to generate a machine-learned model. Note that the learning section 120 of this embodiment is configured by hardware below. The hardware may include at least one of a circuit which processes a digital signal and a circuit which processes an analog signal. For example, the hardware may be configured by one or more circuit devices which are implemented in a circuit substrate or one or more circuit elements implemented in the circuit substrate. The one or more circuit devices are integrated circuits (ICs), for example. The one or more circuit elements are resistances or capacitors, for example.

Furthermore, the learning section 120 may be realized by a processor described below. The learning device 100 of this embodiment includes a memory which stores information and the processor which operates based on the information stored in the memory. The information includes programs and various data, for example. The processor includes hardware. Various types of processor, such as a CPU, a graphics processing unit (GPU), and a digital signal processor (DSP), may be used as the processor. Examples of the memory include a semiconductor memory, such as a static random access memory (SRAM) or a dynamic random access memory (DRAM), a register, a magnetic storage device, such as a hard disk device, or an optical storage device, such as an optical disc device. For example, the memory stores computer readable instructions, and when the processor executes the instructions, functions of the sections included in the learning device 100 are realized as processes. Examples of the instructions include an instruction of an instruction set included in a program and an instruction for instructing an operation of a hardware circuit of the processor.

Specifically, the obtaining section 110 obtains error information indicating an error generated in the electronic apparatus, operation information indicating an operation state of the electronic apparatus, and action information indicating user action performed in response to a notification of the error information. The error information and the operation information have been described above. The action information may determine whether a notification is required as described above. The learning section 120 mechanically learns a condition of a notification of the error information to the user based on data sets in which the error information, the operation information, and the action information are associated with one another. By this, a result of learning for making a notification of the error information which is highly probable that the user determines that a notification is required is obtained. Use of the learning result enables extraction of appropriate error information from among a number of error information and enables a notification of the extracted error information to the user. Consequently, in the electronic apparatus, such as the printer 11, even when a large number of various types of error are generated, a burden of the user may be reduced when the user selects information. A flow of the learning process will be described in detail hereinafter with reference to FIGS. 9 and 10.

2.2 Example of Data Set Used in Learning Process

As described above, the training data used in the learning process in this embodiment is a data set in which the error information, the operation information, and the action information are associated with one another.

The error information indicates an error associated with consumables used in the electronic apparatus. As described above, the consumables deteriorates with use of the electronic apparatus, and therefore, are to be maintained and replaced by the user. The consumables in the printer 11 include the print heads, the tubes, and the various motors. When the electronic apparatus is a projector, the consumables includes a light source. Components serving as the consumables are different according to a type of the electronic apparatus. Since the error information associated with the consumables is processed, the user is prompted to perform a countermeasure appropriate for the consumables.

For example, the electronic apparatus is the printer 11 and the consumables are the print heads. The error is ejection failure of the print heads, that is, clogging of the nozzles 36 of the print heads. With this configuration described above, when ejection failure of the print heads occurs, a determination as to whether a notification of error information associated with the ejection failure is to be performed may be appropriately made. For example, the printer 11 illustrated in FIGS. 1 and 2 has the plurality of recording heads 29, and each of the recording heads 29 has a large number of nozzles 36. Therefore, the error referred to as the ejection failure may frequently occur. However, the printer 11 periodically performs flushing and cleaning, and therefore, minor ejection failure may be automatically resolved without a countermeasure performed by the user. Note that the term "flushing" indicates ejection of ink from the individual nozzles 36 performed independently from the printing. The term "cleaning" indicates cleaning inside the print heads by sucking the print heads using a pump or the like disposed in a discharge ink box without driving the print heads. When the error of the ejection failure occurs, a notification to the user is not required in many times, and therefore, it is likely that a notification of a low necessity degree is frequently made even when filtering is performed using an error ID as the general methods. Accordingly, learning of a notification condition using the machine learning is greatly significant.

Furthermore, the action information is evaluation for a notification. Therefore, information on a result of a determination as to whether a past notification was appropriate may be obtained as the action information. Therefore, a learning process in which evaluation of the user on the notification which has been actually performed is reflected may be performed. Use of a result of the learning process enables a notification desired by the user.

Figure 8:
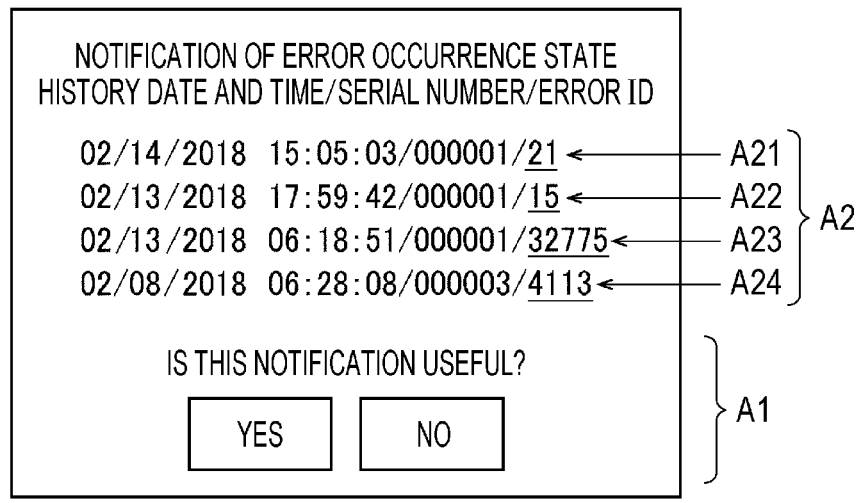
FIG. 8 is a diagram illustrating an example of a screen to which action information is input.

FIG. 8 is a diagram illustrating an example of a screen to which the action information is input. In FIG. 8, a portion of an error notification mail to be transmitted from the server system 410 to the terminal device 420 is illustrated. Note that the notification may be made by a method other than the method using an e-mail as described above. When compared with the example in FIG. 6 in which the action information is not input, information indicated by A1 is added. Specifically, two buttons "Yes" and "No" are displayed along with text information "Is this notification useful?" The two buttons individually serve as links, for example. When "Yes" is selected, the terminal device 420 transmits action information indicating that the notification is required to the server system 410. When "No" is selected, the terminal device 420 transmits action information indicating that the notification is not required to the server system 410.

Specifically, the evaluation information serving as the action information indicates whether the notification is required or not required. Accordingly, a determination as to whether the notification which has been actually performed is required or not required may be directly made by the user, and therefore, a learning process in which intention of the user is reflected may be performed. Therefore, use of a result of the learning enables a notification of error information which is highly probably required by the user.

Alternatively, the individual error information indicated by A2 in FIG. 8 may include respective links. In the example of FIG. 8, the error notification mail includes four links A21 to A24. Although an error ID serves as a like, for example, in FIG. 8, an entire row may serves as a link.

When an operation of selecting a link is performed, the terminal device 420 activates a web browser and requests the server system 410 to obtain the error screen illustrated in FIG. 5. For example, the terminal device 420 requests the error screen in which the selected error is displayed in a position which is easily recognizable by eyes, e.g., a leading position or a center of the screen. By this, the user may browse the error information in detail when compared with the error notification mail based on the operation of selecting a link.

The action information of this embodiment may indicate a user operation for browsing the error screen. Specifically, the error information includes outline information and detailed information having a larger information amount compared with the outline information. In the example above, the error information included in the error notification mail of FIG. 8 corresponds to the outline information, and the information included in the error screen of FIG. 5 corresponds to the detailed information. The action information indicates a result of a determination as to whether the user has performed an action of accessing detailed information based on the notification including the outline information of the error information. In the example described above, when the operation of selecting a link is performed, the terminal device 420 transmits action information indicating that action of accessing the detailed information has been performed to the server system 410. Alternatively, the server system 410 may generate and store action information indicating that the action of accessing the detailed information has been performed when receiving a request for displaying an error screen associated with the error information within a predetermined period of time after a notification indicating given error information is transmitted.

When the transmitted error information is important for the user, the user requests more detailed information to analyze the error information. Specifically, it may be determined that the notification of the error information is required since the detailed information is accessed.

As described above, since data sets in which the error information and the action information are associated with each other are obtained, the error information is determined as input data, and the action information is determined as supervised data corresponding to the input data, a learning process may be performed based on a past notification history. However, when only the error information is used as the input data, it is not easy to determine importance degrees of errors of the same type with sufficient accuracy.

Accordingly, the learning process of this embodiment uses the operation information as input data. The operation information includes information on lifetimes of consumables, for example. The lifetime information has been described above. When lifetimes of the print heads are expired, that is, when the print heads are used over expected lifetimes, it is estimated that deterioration of the print heads has progressed. Therefore, it is difficult to resolve an error by the flushing or the cleaning, and it is highly probable that a countermeasure is required to be performed by the user. On the other hand, when the print heads are almost new, it is highly probable that the ejection failure is resolved without a countermeasure performed by the user. Specifically, a notification indicating a countermeasure may be made taking a state of the printer 11 into consideration using the operation information which reflects an operation state of the printer 11 for the learning process.

Furthermore, the operation information includes information on a use history of the consumables or information on a history of jobs using the consumables. Even when use times of the consumables are the same, different deterioration degrees of consumables may be obtained in different examples, that is, an example in which the consumables are used for 8 hours a day and are not used for remaining 16 hours and an example in which the consumables are continuously used for 24 hours. Specifically, when deterioration of the consumables are to be determined, not only simple accumulated use time but also a history of use is preferably used. Furthermore, the job history information indicates a type of a print job, a timing when the print job has been input, and a timing when the print job has been executed. When content of the job is determined, a use state of the consumables is also determined, and therefore, a history of use of the consumables may be estimated also using the job history information. In this way, since detailed information on the consumables is used in the learning process, a notification condition may be learnt with high accuracy.

Furthermore, other information included in the operation information may be used as input data in the learning process. For example, the learning device 100 may use ink consumption amount information, print amount information, event information, and the like as the input data.

2.3 Concrete Example of Learning

A learning process based on data sets will be described in detail. Here, a machine learning using a neural network will be described.

Figure 9:
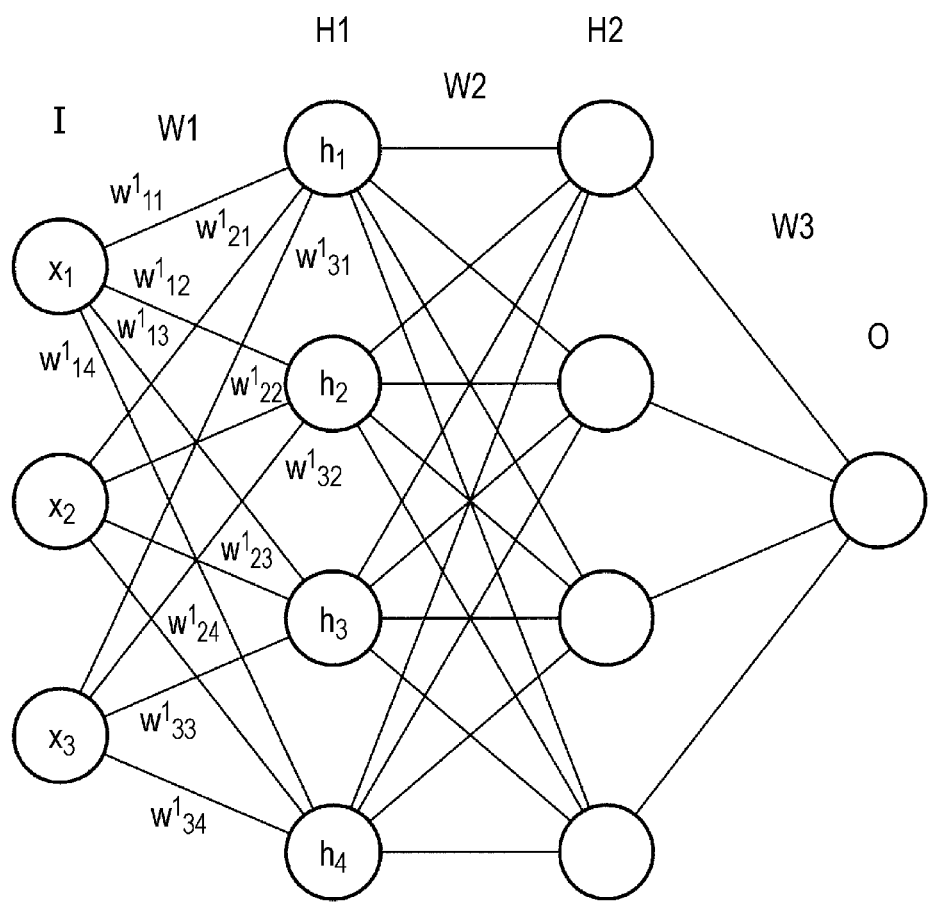
FIG. 9 is a diagram illustrating a configuration of a neural network.

FIG. 9 is an example of a basic configuration of the neural network. The neural network is a mathematical model for simulating a brain function on a computer. Each circle in FIG. 9 is referred to as a node or a neuron. In the example of FIG. 9, the neural network includes an input layer, two intermediate layers, and an output layer. The input layer is denoted by I, the intermediate layers are denoted by H1 and H2, and the output layer is denoted by O. Furthermore, in the example of FIG. 9, the number of neurons in the input layer is three, the number of neurons in each of the intermediate layers is four, and the number of neurons in the output layer is one. Note that the number of intermediate layers and the numbers of neurons included in the individual layers may be variously modified. Each of the neurons included in the input layer is coupled to the neurons included in the first intermediate layer H1. Each of the neurons included in the first intermediate layer is coupled to the neurons included in the second intermediate layer H2, and each of the neurons included in the second intermediate layer is coupled to the neuron included in the output layer. Note that the intermediate layers may be referred to as hidden layers.

The input layer includes the neurons which output respective input values. In the example of FIG. 9, the neural network receives $x_1$, $x_2$, and $x_3$ as inputs, and the neurons in the input layer output $x_1$, $x_2$, and $x_3$, respectively. Note that certain preprocessing may be performed on the input values so that the neurons included in the input layer output values obtained after the preprocessing.

In the neurons in the intermediate layers onwards, a calculation of simulating a state in which information is transmitted as an electric signal in a brain is performed. In a brain, easiness of transmission of information is changed depending on coupling degrees of synapses, and therefore, the coupling degrees are indicated by weights W in the neural network.

In FIG. 9, "W1" indicates a weight between the input layer and the first intermediate layer. Here, "W1" indicates aggregation of a weight of a given neuron included in the input layer and a weight of a given neuron included in the first intermediate layer. When a weight between a p-th neuron in the input layer and a q-th neuron in the first intermediate layer is denoted by "$w^1_{pq}$", the weight W1 of FIG. 9 is information including 12 weights $w^1_{11}$ to $w^1_{34}$. The weight W1 means information including a number of weights corresponding to a product of the number of neurons included in the input layer and the number of neurons included in the first intermediate layer in a broad sense.

In the first intermediate layer, a calculation based on Expression (1) is performed on a first neuron. In one neuron, outputs of neurons in a preceding layer coupled to the neuron are subjected to a product-sum operation and a bias is further added to a resultant value. The bias in Expression (1) is denoted by $b_1$.

$$h_1 = f\left(\sum_i w^1_{i1} \cdot x_i + b_1\right) \tag{1}$$

Furthermore, as illustrated in Expression (1), in a calculation in one neuron, an activating function f which is a non-linear function is used. An ReLU function indicated by Expression (2) below is used as the activating function f, for example. In the ReLU function, when a variable is 0 or less, 0 is selected and when a variable is larger than 0, a value of the variable itself is selected. However, various functions may be generally used as the activating function f, and a sigmoid function or a function obtained by modifying the ReLU function may be used. Although a calculation formula about hi is illustrated in Expression (1), the similar calculation is performed on the other neurons included in the first intermediate layer.

$$f(x) = \max(0, x) = \begin{cases} 0 & (x \leq 0) \\ x & (x \geq 0) \end{cases} \tag{2}$$

The same is true to the layers onwards. Assuming that a weight between the first and second intermediate layers is denoted by "W2", in each of the neurons included in the second intermediate layer, a product-sum operation is performed using outputs of the first intermediate layer and the weight W2, a bias is added, and a calculation of applying an activating function is performed.

In the neuron included in the output layer, outputs of the preceding layer are added by weighting and a bias is added. In the example of FIG. 9, the preceding layer of the output layer is the second intermediate layer. In the neural network, a result of the calculation in the output layer corresponds to an output of the neural network. Alternatively, certain post-processing may be performed on a result of the calculation in the output layer and a result of the post-processing may be output.

As is apparent from the description above, an appropriate weight and an appropriate bias are required to be set to obtain a desired output from an input. Note that the weight may be referred to as a weighting coefficient hereinafter. Furthermore, a bias may be included in the weighting coefficient. In the learning, data sets of given inputs x and appropriate outputs for the inputs which are associated with each other are prepared. An appropriate output is supervised data t. The learning process in the neural network may be considered as a process of obtaining a most probable weighting coefficient based on the data sets. In the learning process in the neural network, backpropagation is widely used.

Figure 10:
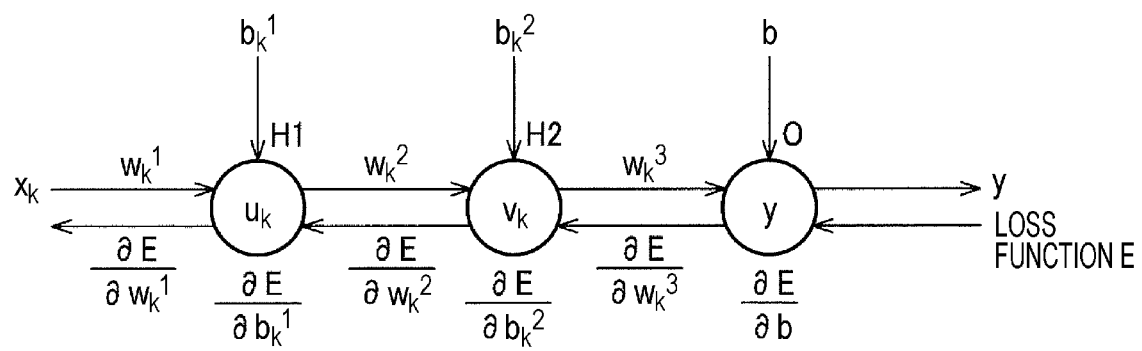
FIG. 10 is a diagram illustrating backpropagation.

FIG. 10 is a diagram illustrating the backpropagation. Note that, for simplicity of description, processing is performed while only one neuron is focused in each of the first intermediate layer, the second intermediate layer, and the output layer in FIG. 10. Furthermore, the learning process in the neural network is not limited to that using the backpropagation.

In the backpropagation, a forward pass and a backward pass are repeatedly performed so that a parameter is updated. Here, the parameter indicates the weighting coefficient described above. First, an output y is calculated using the input x and weighting coefficients at individual time points. Note that various settings may be performed as an initial value of the weighting coefficient. In the example of FIG. 10, calculations in Expressions (3) to (5) are performed so that y is obtained from xk. In Expression (3) to (5), "u" indicates an output of the first intermediate layer and "v" indicates an output of the second intermediate layer.

$$y = \sum_{k=1}^{n} (w_k^3 \cdot v_k) + b \tag{3}$$

$$v = f\left(\sum_{k=1}^{n} (w_k^2 \cdot u_k) + b^2\right) \tag{4}$$

$$u = f\left(\sum_{k=1}^{n} (w_k^1 \cdot x_k) + b^1\right) \tag{5}$$

Then a loss function E is obtained based on the obtained output y and supervised data t corresponding to the input x. Although the loss function E is represented by Expression (6), the loss function E may be a simple difference (y−t) or another loss function may be used. A process performed until the loss function E is obtained is referred to as a forward pass.

$$E = \tfrac{1}{2}(y-t)^2 \tag{6}$$

After the loss function E is obtained by the forward pass, parameters are updated using partial differentials of the loss function E as illustrated in Expressions (7) to (12). In Expressions (7) to (12) below, values to which an index "+1" is added indicate values obtained after the update process. For example, "$b_{+1}$" indicates a value of b obtained after the update process. Furthermore, "η" indicates a learning rate. The learning rate is preferably not constant but is changed in accordance with a learning state.

$$b_{+1} = b - \eta \frac{\partial E}{\partial b} \tag{7}$$

$$w_{k+1}^3 = w_k^3 - \eta \frac{\partial E}{\partial w_k^3} \tag{8}$$

$$b_{k+1}^2 = b_k^2 - \eta \frac{\partial E}{\partial b_k^2} \tag{9}$$

$$w_{k+1}^2 = w_k^2 - \eta \frac{\partial E}{\partial w_k^2} \tag{10}$$

$$b_{k+1}^1 = b_k^1 - \eta \frac{\partial E}{\partial b_k^1} \tag{11}$$

$$w_{k+1}^1 = w_k^1 - \eta \frac{\partial E}{\partial w_k^1} \tag{12}$$

In this case, the partial differentials of the loss function E for the parameters are calculated using a chain rate in a direction from the output layer to the input layer. Specifically, the partial differentials in Expressions (7) to (12) may be easily obtained by calculating Expressions (13) to (18) below in turn. Furthermore, when the ReLU function of Expression (2) above is used as the activating function f, the differential value is 0 or 1, and therefore, a calculation of the partial differentials may be easily performed. A series of processes using Expressions (7) to (18) is referred to as a backward pass.

$$\frac{\partial E}{\partial b} = \frac{\partial E}{\partial y} \cdot \frac{\partial y}{\partial b} = (y-t) \tag{13}$$

$$\frac{\partial E}{\partial w_k^3} = \frac{\partial E}{\partial y} \cdot \frac{\partial y}{\partial w_k^3} = (y-t) \cdot v_k \tag{14}$$

$$\frac{\partial E}{\partial b_k^2} = \frac{\partial E}{\partial y} \cdot \frac{\partial y}{\partial v_k} \cdot \frac{\partial v_k}{\partial b_k^2} = (y-t) \cdot w_k^3 \cdot f'(v_k) \tag{15}$$

$$\frac{\partial E}{\partial w_k^2} = \frac{\partial E}{\partial y} \cdot \frac{\partial y}{\partial v_k} \cdot \frac{\partial v_k}{\partial w_k^2} = (y-t) \cdot w_k^3 \cdot f'(v_k) \cdot u_k \tag{16}$$

$$\frac{\partial E}{\partial b_k^1} = \frac{\partial E}{\partial y} \cdot \frac{\partial y}{\partial v_k} \cdot \frac{\partial v_k}{\partial u_k} \cdot \frac{\partial u_k}{\partial b_k^1} = (y-t) \cdot w_k^3 \cdot f'(v_k) \cdot w_k^2 \cdot f'(u_k) \tag{17}$$

$$\frac{\partial E}{\partial w_k^1} = \frac{\partial E}{\partial y} \cdot \frac{\partial y}{\partial v_k} \cdot \frac{\partial v_k}{\partial u_k} \cdot \frac{\partial u_k}{\partial w_k^1} = (y-t) \cdot w_k^3 \cdot f'(v_k) \cdot w_k^2 \cdot f'(u_k) \cdot x_k \tag{18}$$

In the learning process of this embodiment, an input x of the neural network corresponds to the error information and the operation information. In the error information, a value of an error ID is used as an input value, for example. Furthermore, when additional information is included in the error information, information obtained by digitalizing the information is used as an input value. Specifically, the error information may be input data for a neuron in the input layer or input data for a plurality of neurons.

Furthermore, the information on lifetimes of consumables corresponds to numerical value data indicating a rate of a use time to an expected lifetime, for example. Specifically, a single numerical value indicating the information on lifetimes of consumables corresponds to data input to a single neuron in the input layer.

Furthermore, the information on a use history of consumables is indicated by a 2×k-order vector obtained by collecting k pairs of consumables use start timings and consumables use end timings (k is a positive integer), for example. The use start timings and the use end timings are numerical value data represented by a time difference or the like based on an error occurrence time point, for example. In this way, the information on a use history of consumables may be represented by numerical data. In this case, the information on a use history of consumables serves as data input to the 2×k neurons included in the input layer. Note that the information on a use history of consumables may be a pair of use start timing and a continuous use time or a plurality of numerical value data indicating change of lifetimes with time. Specifically, a process of converting the information on a use history of consumables stored in the server system 410 into input data of the neural network may be variously modified.

Similarly, when the job history information is used as the input data, the conversion process may be variously modified. Note that, when the job history information is used, image data to be printed in a print job may be used as the input data. In a learning process using image data, a convolutional neural network (CNN) which is widely used, for example, may be used. The CNN includes a convolutional layer and a pooling layer. A convolutional calculation is performed in the convolutional layer. Here, the convolutional calculation is specifically a filter process. A process of reducing horizontal and vertical sizes of data is performed in the pooling layer. In the CNN, when image data is input, for example, a process taking the relationship between a given pixel and pixels in the vicinity of the given pixel into consideration may be performed. In the CNN, characteristics of a filter used in the convolutional calculation is learnt by the machine learning. Specifically, the weighting coefficients in the neural network include the filter characteristics in the CNN.

Furthermore, other operation information, such as information on an ink consumption amount or information on a print amount may be used as the input data. The information on an ink consumption amount indicates an amount of consumption of ink in a given period of time using an error occurrence time point as a reference, for example. Similarly, the information on a print amount indicates a printing length or a printing area in a given period of time using an error occurrence time point as a reference, for example.

Furthermore, the supervised data t is action information included in training data. When an evaluation indicating that notification is required is made or when detailed information is accessed, for example, the action information is 1. Furthermore, when an evaluation indicating that notification is not required is made or when the detailed information is not accessed, the action information is 0. Furthermore, the action information is not limited to binary data. For example, when only the buttons indicated by A1 of FIG. 8 are provided as a section for inputting action information, and when any of the "Yes" and "No" buttons is not selected, an intermediate value, such as 0.5, may be obtained. Alternatively, the action information may have a numerical value having multiple stages which becomes larger as a period of time from a transmission of an error notification mail to access to the detailed information is shorter.

The machine-learned model which is a result of learning receives the error information and the operation information corresponding to the error information as inputs and outputs data indicating a result of a determination as to whether a notification indicating error information is to be made as an output. In the foregoing example, an output of the machine-learned model is a value close to 1 when necessity of notification is high and is a value close to 0 when the necessity of notification is low.

As described above, the learning section 120 generates a machine-learned model by the machine learning. The method of this embodiment may be applied to the machine-learned model. The machine-learned model is used to determine whether a notification of error information indicating an error generated in the electronic apparatus is to be made to the user. The information on a weighting coefficient is set in the machine-learned model having an input layer, an intermediate layer, and an output layer, based on data sets including error information, operation information, and action information which are associated with one another. The information on a weighting coefficient includes a first weighting coefficient between the input layer and the intermediate layer and a second weighting coefficient between the intermediate layer and the output layer. In the example of FIG. 9, the first weighting coefficient is indicated by W1 and the second weighting coefficient is indicated by W3. Furthermore, when two or more intermediate layers are included, the information on a weighting coefficient may include a weighting coefficient between a given intermediate layer and a succeeding intermediate layer. The information on a weighting coefficient includes the weight W2, for example, in the example of FIG. 9. The machine-learned model causes a computer to input the error information and the operation information which are received as an input in the input layer, perform a calculation based on the set information on a weighting coefficient, and output data indicating a result of a determination as to whether a notification of the error information is made to the user from the output layer. However, as described below as a modification, the operation information may be input to the input layer among the error information and the operation information which are received as an input in the machine-learned model. The machine-learned model in this case is aggregation of a plurality of machine-learned models set for individual types of error, for example.

Note that a machine-learned model uses a neural network in the description hereinabove as an example. However, the machine learning in this embodiment is not limited to the method using a neural network. For example, various general machine learning methods, such as a support vector machine (SVM), or a further developed machine learning method may be applied as the method of this embodiment, for example.

3. Estimation Process 3.1 Example of Configuration of Estimation Device

Figure 11:
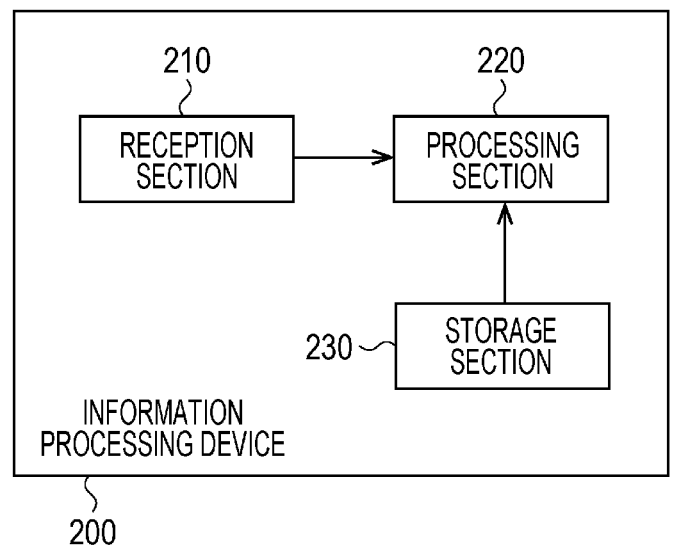
FIG. 11 is a diagram illustrating an example of an information processing device executing an estimation process.

FIG. 11 is a diagram illustrating an example of a configuration of an information processing device 200 serving as an estimation device of this embodiment. The information processing device 200 includes a reception section 210, a processing section 220, and a storage section 230.

The storage section 230 stores a machine-learned model obtained by mechanically learning a condition of a notification of the error information to the user based on data sets in which the error information, the operation information, and the action information are associated with one another. The error information, the operation information, and the action information have been described above. The reception section 210 receives the error information and the operation information transmitted from the electronic apparatus. The processing section 220 performs a process of determining whether a notification of the error information is to be made to the user based on the machine-learned model. Specifically, the processing section 220 obtains data indicating a result of a determination as to whether a notification of the error information is to be made. The data indicating a result of a determination as to whether a notification of the error information is to be made is not limited to binary data and is numerical value data indicating probability, for example.

In this way, the determination as to whether a notification of the error information is to be made may be appropriately performed based on various operation information. That is, provision of information for the user may be optimized, and therefore, the user may easily recognize an operation information. Furthermore, a burden of the user, such as information selection, may be omitted. Furthermore, miss of important error information by the user may be suppressed. Moreover, when an appropriate notification is performed, the user may recognize a sign of a failure state of the electronic apparatus before the electronic apparatus enters the failure state. Accordingly, the user may perform proactive preventive maintenance.

Note that the machine-learned model is used as a program module which is a portion of artificial intelligence software. The processing section 220 outputs data indicating a result of a determination as to whether a notification of the error information which is an input is to be made in accordance with an instruction issued by the machine-learned model stored in the storage section 230.

As with the learning section 120 of the learning device 100, the processing section 220 of the information processing device 200 is configured by hardware which includes at least one of a circuit which processes digital signals and a circuit which processes analog signals. Furthermore, the processing section 220 may be realized by a processor below. The information processing device 200 of this embodiment includes a memory which stores information and a processor which operates based on the information stored in the memory. Various processors may be used, such as a CPU, a GPU, and a DSP, as the processor. The memory may be a semiconductor memory, a register, a magnetic storage device, or an optical storage device.

Note that the calculation performed by the processing section 220 based on the machine-learned model, that is, the calculation for outputting output data based on input data may be executed by software or hardware. That is, a product-sum calculation in Expression (1) above and the like or the filter calculation in the CNN may be executed by software. Alternatively, the calculations may be executed by a circuit device, such as a field-programmable gate array (FPGA). Furthermore, the calculations may be executed by a combination of software and hardware. Accordingly, the operation of the processing section 220 in accordance with an instruction issued by the machine-learned model stored in the storage section 230 may be realized in various modes.

The information processing device 200 illustrated in FIG. 11 is included in the server system 410 of FIG. 3, for example. Specifically, the server system 410 receives error information and operation information from the print system 300 and determines whether a notification of the error information is supplied to the terminal device 420 based on the machine-learned model. Note that the information processing device 200 may be included in an apparatus other than the server system 410. For example, the information processing device 200 is included in an apparatus coupled to the server system 410 through the network NE2. The apparatus performs a process of determining whether a notification is to be performed by obtaining the error information and the operation information collected by the server system 410 through the network NE2. The server system 410 obtains a result of the determination process and executes a process associated with the notification based on the result. Furthermore, a single information processing device 200 may be used or a plurality of information processing devices 200 may be used.

3.2 Concrete Example of Estimation Process

Figure 12:
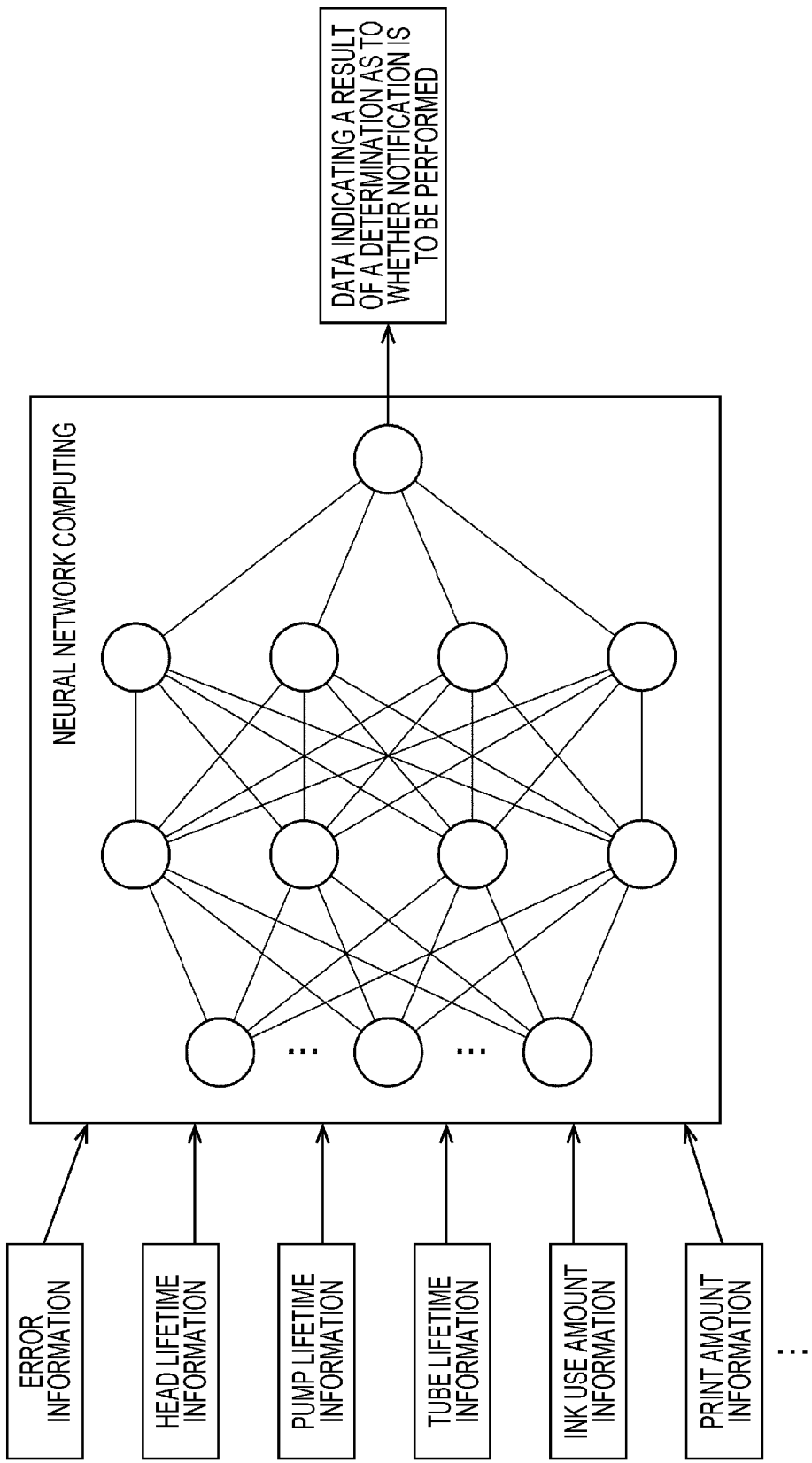
FIG. 12 is a diagram illustrating examples of input data and output data in the estimation process.

FIG. 12 is a diagram illustrating the relationships between inputs and outputs in the estimation process according to this embodiment. In FIG. 12, neural network computing will be described. Inputs in the estimation process include the error information and the operation information. As illustrated in FIG. 12, the operation information includes the information on lifetimes of the print heads, information on a lifetime of the pump, information on lifetimes of the tubes, information on an ink use amount, and information on a print amount information, for example. The inputs in the estimation process may further include other operation information, such as event information. Specifically, information used as input data in the learning process serves as an input in the estimation process.

The processing section 220 performs the neural network computing based on the inputs. Then the processing section 220 outputs information indicating a result of a determination as to whether a notification of the error information is to be performed as an output. For example, the output is numerical value data in a range from r to s, and value of the numerical value data becomes larger as it is determined that necessity of the notification of the error information is higher. For example, although r is 0 and s is 1, concrete numerical values are not limited to these.

Figure 13:
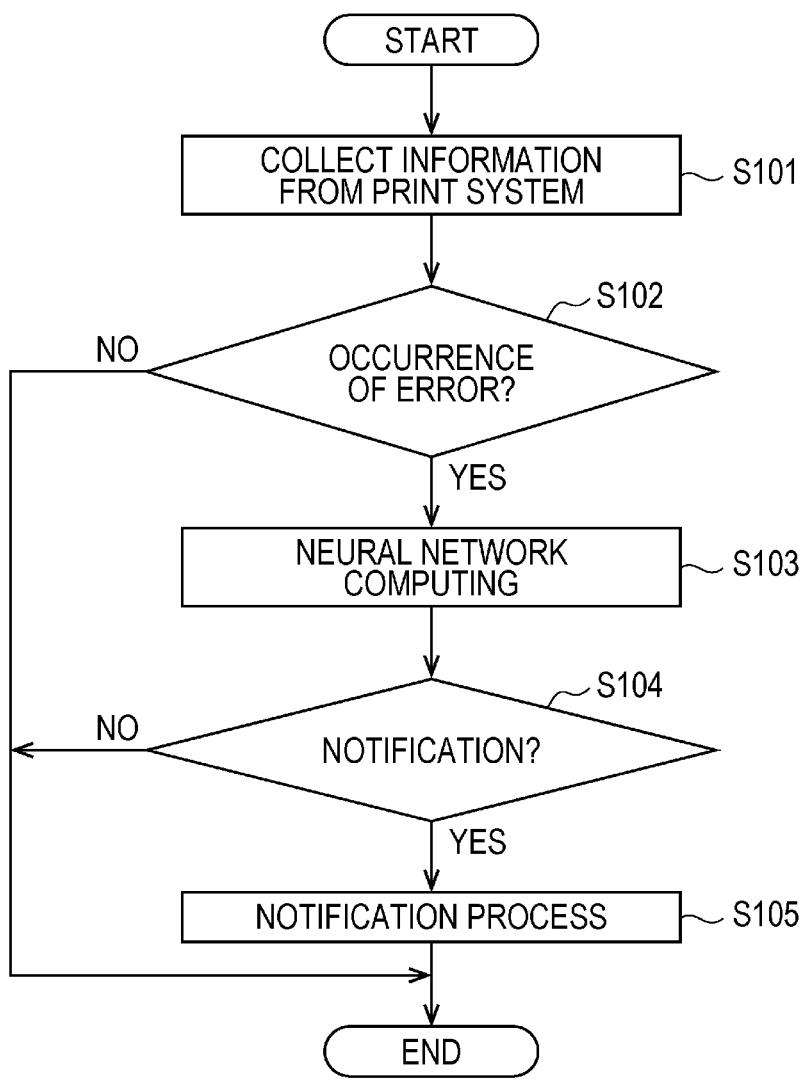
FIG. 13 is a flowchart of the estimation process.

FIG. 13 is a flowchart of a process performed by the processing section 220. The processing section 220 periodically collects the error information and the operation information from the print system 300 (S101). The processing section 220 determines whether an error has occurred in the printer 11 based on the information obtained in step S101 (S102). Specifically, the processing section 220 determines whether error information is included in the information obtained in step S101. When an error has not occurred (No in S102), the process is terminated without performing a process in step S103 onwards.

When an error has occurred (Yes in S102), the processing section 220 performs the neural network computing using the error information and the operation information as inputs (S103). The processing section 220 determines whether a notification of the error information is required based on a result of the neural network computing (S104). When an output of the neural network is numerical value data in the range from r to s, for example, the processing section 220 determines that the notification of the error information is required when the output value is equal to or larger than a given threshold value Th (Th is a number which is larger than r and smaller than s).

When it is determined that the notification is required (Yes in S104), the processing section 220 performs a process of notifying the preset terminal device 420 of the error information (S105). For example, the storage section 230 stores serial numbers of the printer 11 and information for associating the user who is in charge of maintenance and the terminal device 420 used by the user with each other. The processing section 220 performs a notification on the terminal device 420 of the person in charge of the printer 11 in which the error has occurred based on the information. As described above, the notification process in step S105 may be a process of transmitting a mail or a process of performing other push notification. When it is determined that the notification is not required (No in S104), the processing section 220 terminates the process without performing the process in step S105.

Furthermore, the notification process is not limited to the two processes including the process of performing a notification and the process of not performing a notification. For example, the processing section 220 may categorizes an output of the neural network into three ranges, that is, a range not less than r and less than Th1, a range not less than Th1 to less than Th2, and a range not less than Th2 and less than Th2, and a range not less than Th2 and less than s so as to perform three different types of notification. Th1 and Th2 are numbers which satisfies "r<Th1<Th2<s. For example, the information processing apparatus 200 performs a normal notification process when an output value is not less than Th1 and less than Th2 and performs a notification with alert when the output value is not less than Th2. Reliability of estimation performed when the output is not less than Th2 is higher than that when the output is less than Th2, and therefore, the notification with alert which is more easily recognized by the user is performed when the output is not less than Th2. By this, the user is prompted to quickly perform a countermeasure. Concrete notification processes may be variously modified.

Note that the example in which the determination as to whether a notification is required is performed every time error information is obtained and the notification process is immediately executed when the notification is required is described in the flowchart of FIG. 12. In the method of this embodiment, the notification may be made only for important information, and therefore, notification frequency is not excessively high even when this process is performed. However, timings of the processes are not limited to these. For example, the notification process in step S105 may be performed once in a given period of time. The period of time corresponds to approximately several hours, for example. By this, since the notification frequency is low, a feeling of troublesome of the user may be suppressed. Furthermore, in this case, the processing section 220 may not immediately perform the processes in step S102 and step S103. For example, the processing section 220 may accumulate error information in a predetermined period of time and collectively execute the processes in step S102 and step S103 on the accumulated error information. The concrete processes may be variously modified.

4. Additional Learning Based on Estimation Result

The learning process and the estimation process are individually described above. For example, training data is accumulated in advance in a learning step, and the learning process is performed based on the accumulated training data. For example, the server system 410 performs a notification process similar to that of the general method in the learning step. Note that, in this case, action information which is the training data is obtained by performing the notification illustrated in FIG. 8. When the training data including the action data is accumulated to a certain amount, the learning device 100 performs the learning process described above so as to generate a machine-learned model. In an estimation step, the information processing apparatus 200 performs an estimation process by continuously using the generated machine-learned model. In this case, the machine-learned model generated once is fixed and update thereof is not expected.

Note that the method of this embodiment is not limited to this, and a result of the estimation process may be fed back to the learning process. Specifically, the processing section 220 of the information processing apparatus 200 notifies the terminal device 420 of the error information determined that a notification thereof is required based on the machine-learned model. The obtaining section 110 of the learning device 100 obtains action information corresponding to the notification and error information and operation information which correspond to the action information. The learning section 120 of the learning device 100 mechanically learns a condition of a notification based on data sets in which the obtained error information, the obtained operation information, and the obtained action information are associated with one another. In this way, the machine-learned model is updates using the action information for the notification performed based on the estimation process. Therefore, a notification of error information which is important for the user is facilitated.

Figure 14:
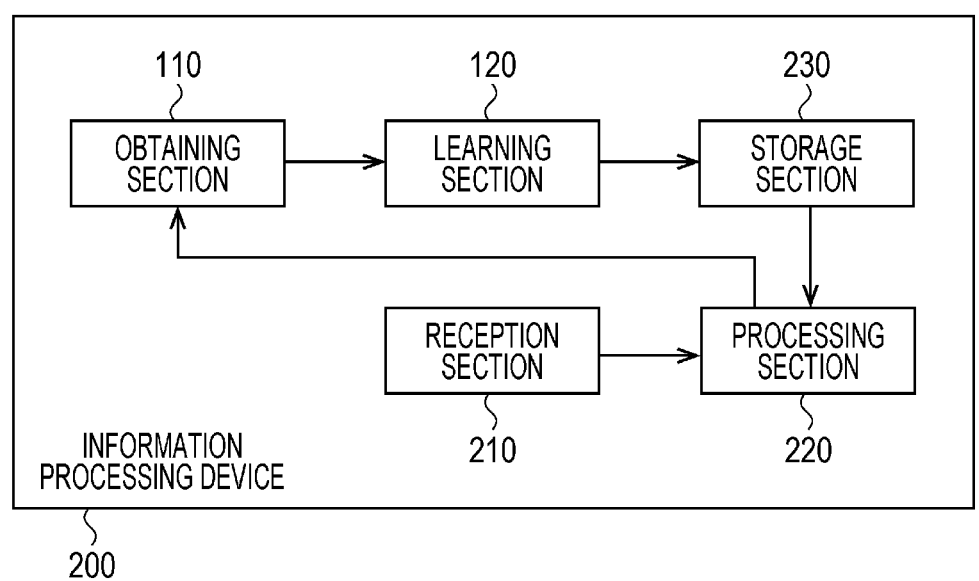
FIG. 14 is a diagram illustrating an example of another information processing device executing an estimation process.

FIG. 14 is a diagram illustrating an example of a configuration of the information processing apparatus 200 when an additional learning is performed. The information processing apparatus 200 includes the obtaining section 110 and the learning section 120, in addition to the reception section 210, the processing section 220, and the storage section 230. Specifically, the information processing device 200 of FIG. 14 includes the same components as the learning device 100 illustrated in FIG. 7 in addition to the components illustrated in FIG. 11 and may execute both the learning process and the estimation process. The information processing device 200 illustrated in FIG. 14 is included in the server system 410 of FIG. 3, for example. The learning process and the estimation process may be efficiently executed in the same apparatus when the information processing device 200 illustrated in FIG. 14 is used. Note that, when the additional learning is performed, the learning process and the estimation process may be executed in different devices.

FIG. 15 is a flowchart of a process performed by the information processing apparatus 200 when the additional learning is performed. A process from step S201 to step S205 of FIG. 15 is the same as the process from step S101 to step S105 of FIG. 13. When a process of notification is executed in step S205, the information processing apparatus 200 obtains action information corresponding to the notification (S206). For example, in the notification process in step S205, the information processing apparatus 200 transmits an error notification mail including the buttons and the links described with reference to FIG. 8 and obtains action information indicating an operation for the error notification mail. Then the processing section 220 of the information processing apparatus 200 performs machine learning based on data sets in which error information, operation information, and the action information are associated with one another so as to update a machine-learned model (S207).

Note that, when action information indicating that the notification is required is obtained in step S206, the estimation process performed based on the machine-learned model is correct. That is, a desired result is obtained without updating the machine-learned model. On the other hand, when action information indicating that the notification is not required is obtained in step S206, the estimation process using the machine-learned model is wrong. In this case, an appropriate result is not obtained using the current machine-learned model, and therefore, update of the machine-learned model is highly required. In FIG. 15, when the notification process is performed, the additional learning is performed. However, the present disclosure is not limited to this. The information processing apparatus 200 may perform the additional learning only when the notification is inappropriately performed. By this, the additional learning may be efficiently performed.

5. Modification

As described with reference to FIG. 12, the error information is input data of the learning process and the estimation process in the foregoing embodiment. The error information includes information specifying a type of an error, such as an error ID. In this case, a common machine-learned model may be generated and used for different types of error information. For example, a determination as to whether a notification is required may be made for each error information which may be generated in the electronic apparatus using the same single machine-learned model.

However, in this case, it is difficult to narrow down the relationships between the error information and the operation information. For example, the error of the ejection failure is deemed to have high correlation with the information on lifetimes of heads, the information on lifetimes of tubes, information on lifetimes of the flow path filters, and the like. On the other hand, the ejection failure does not have correlation with operation information of transport members, such as the first roller 21, and operation information of members included in the drying device 16. Specifically, various information included in the operation information are divided into information having high correlation with given error information and information having low correlation with the error information. As illustrated in FIG. 12, when a machine-learned model which may support various error information is configured, it is highly probable that a large number of operation information are associated with error information of some sort. Specifically, the number of operation information which are significant as input data is considerably increased. As a result, it is not easy to reduce the number of input data and it is likely that loads of the learning process and the estimation process are increased.

Accordingly, the learning device 100 of this embodiment may generate a plurality of machine-learned model in accordance with a type of error. For example, the learning device 100 generates a single machine-learned model for single error information. In this case, the input data is operation data which is highly correlated with the target error information and supervised date is the action information. By limiting the operation information to be used as input data, loads of the learning process and the estimation process may be reduced.

The method illustrated for sharing a machine-learned model by a plurality of error information is advantageous in that the number of machine-learned models is small and extraction of operation information to be used as input data is not required to be performed by manpower. On the other hand, the method for generating machine-learned models for individual error information is advantageous in that the number of input data is small and a processing load is small when a single machine-learned model is focused.

Alternatively, the learning device 100 may categorize the error information into a number of categories of an ink processing system, a printing medium transport system, a drying system, and the like, and generate machine-learned models for individual categories. A plurality of error information included in the same category have a certain degree of correlation, and therefore, operation information having high correlation may be similar. Therefore, the number of machine-learned models and the number of input data may be suppressed.

As described above, the information processing device 200 according to this embodiment includes the storage section 230, the reception section 210, and the processing section 220. The storage section 230 stores a machine-learned model obtained by mechanically learning a condition of a notification of error information to the user based on data sets in which the error information, the operation information, and the action information are associated with one another. The error information indicates an error which occurs in the electronic apparatus. The operation information indicates an operation state of the electronic apparatus. The action information indicates user action performed in response to the notification of the error information. The reception section 210 receives the error information and the operation information transmitted from the electronic apparatus. The processing section 220 determines whether a notification of the error information is to be made to the user based on the machine-learned model.

According to the method of this embodiment, a determination as to whether a notification of the error information is to be performed is made using the machine-learned model generated by the mechanical learning based on the data sets in which the error information, the operation information, and the action information are associated with one another. Since the machine-learned model generated based on the action information is used, a determination may be made taking the user action associated with the determination as to whether the notification is required into consideration. Furthermore, since the operation information is used, a determination may be made taking an operation state of the electronic apparatus into consideration in addition to information on a type of error or the like. In this way, a determination as to whether a notification is required may be made with high accuracy by using a result of the machine learning based on appropriate training data.

Furthermore, the action information may be information on evaluation of the notification.

By this, user evaluation associated with the notification may be used as the action information.

Furthermore, the evaluation information may indicate a result of a determination as to whether a notification is required.

By this, information indicating a result of the determination, made by the user, as to whether a notification is required may be used as the evaluation information.

The error information may include outline information and detailed information having larger amount of information when compared with the outline information. The action information indicates whether an action of accessing detailed information has been performed by the user on the notification including the outline information of the error information.

By this, information indicating the information indicating whether the user has accessed the detailed information may be used as the action information.

Furthermore, the error information may indicate an error associated with consumables used in the electronic apparatus.

By this, a determination as to whether a notification of error information of consumables of the electronic apparatus is to be performed may be made with high accuracy.

Furthermore, the operation information may include information on lifetimes of the consumables.

By this, a determination as to whether a notification is to be performed may be made based on use states of the consumables.

Furthermore, the operation information may include information on a use history of the consumables or information on a history of jobs using the consumables.

By this, a determination as to whether a notification is to be performed may be made based on use states of the consumables in time series.

Furthermore, the consumables may be the print heads, and the error may be ejection failure of one of the print heads.

By this, a determination as to whether a notification of error information indicating ejection failure is to be performed may be made with high accuracy.

Furthermore, the learning device 100 of this embodiment includes the obtaining section 110 and the learning section 120. The obtaining section 110 obtains error information indicating an error generated in the electronic apparatus, operation information indicating an operation state of the electronic apparatus, and action information indicating user action performed in response to a notification of the error information. The learning section 120 mechanically learns a condition of a notification of error information to the user based on data sets in which the error information, the operation information, and the action information are associated with one another.

According to the method of this embodiment, since the action information is used for the machine learning, a result of the learning may be obtained taking a determination as to whether a notification is required into consideration. Furthermore, since the operation information is used in the machine learning, a result of learning may be obtained taking an operation state of the electronic apparatus into consideration in addition to information on a type of error and the like into consideration.

Furthermore, the machine-learned model according to this embodiment is used to determine whether a notification of error information indicating an error generated in the electronic apparatus and has the input layer, the intermediate layer, and the output layer. In the machine-learned model, the weighting coefficient information including the first weighting coefficient between the input layer and the intermediate layer and the second weighting coefficient between the intermediate layer and the output layer is set based on data sets in which the error information, the operation information indicating the operation state of the electronic apparatus, and the action information indicating the user action performed in response to the notification of the error information are associated with one another. The machine-learned model causes the computer to receive the error information and the operation information as inputs, input at least the operation information in the input layer, perform a calculation based on the set information on the weighting coefficient, and output data indicating a result of a determination as to whether a notification of the error information is to be made to the user from the output layer.

In this way, since the information on the weighting coefficient is learnt by the learning process, a machine-learned model which may appropriately determine whether a notification of the error information is to be performed may be generated. Specifically, a machine-learned model using the neural network may be generated.

Although the embodiment has been described in detail above, those skilled in the art may easily understood that various modifications may be made without noumenally departing from novelty and effects of this embodiment. Therefore, such modifications are all included in the scope of the present disclosure. For example, terms which are described at least once along with different terms which have wide meanings or which have the same meanings may be replaced by the corresponding different terms in any portion in the specification and the drawings. Furthermore, all combinations of the embodiment and the modifications are included in the scope of the present disclosure. Furthermore, configurations and operations of the learning device, the information processing device, and the system including the learning device and the information processing device are also not limited to those described in this embodiment, and various modifications may be made.

What is claimed is:

1. An information processing device comprising:
   a storage that stores a machine-learned model obtained by mechanically learning a condition for a notification of error information, and the machine-learned model is trained on a data set in which the condition for the notification of error information is associated with (i) the error information indicating an error generated in an electronic apparatus, (ii) operation information indicating an operation state of the electronic apparatus, and (iii) action information indicating user action performed in response to the notification of the error information, wherein
   the error information includes outline information which is information included in the notification of the error information and detailed information which is larger than the outline information in amount such that the detailed information allows the user to view the error information in detail, and
   wherein the action information includes evaluation information obtained from the user which indicates an evaluation of the notification including whether or not the user considered the notification to be useful to the user the action information includes browsing information which indicates whether or not the user accessed the detailed information from the outline information of the error information;
   a reception section configured to receive the error information and the operation information transmitted from the electronic apparatus; and
   a processor configured to determine whether a notification of the error information is to be made to the user based on an output of the machine-learned model that indicates a result of a determination of whether the notification of the error notification is to be made.

2. The information processing device according to claim 1, wherein the error information indicates the error associated with consumables used in the electronic apparatus.

3. The information processing device according to claim 2, wherein the operation information includes information on lifetimes of the consumables.

4. The information processing device according to claim 2, wherein the operation information includes information on a use history of the consumables or information on a history of jobs using the consumables.

5. The information processing device according to claim 2, wherein
   the consumables are print heads, and
   the error is ejection failure of the print heads.

6. A learning device comprising:
   an obtaining section configured to obtain error information indicating an error generated in an electronic apparatus, operation information indicating an operation state of the electronic apparatus, and action information indicating user action performed in response to a notification of the error information, wherein
   the error information includes outline information which is information included in the notification of the error information and detailed information which is larger than the outline information in amount such that the detailed information allows the user to view the error information in detail, and
   wherein the action information includes evaluation information obtained from the user which indicates an evaluation of the notification including whether or not the user considered the notification to be useful to the user the action information includes browsing information which indicates whether or not the user accessed the detailed information from the outline information of the error information; and a learning section configured to mechanically learn a condition of a notification of the error information to the user as a machine-learned model, and the machine-learned model is trained on a data set in which the condition for the notification of error information is associated with the error information, the operation information, and the action information.

7. A non-transitory computer-readable recording medium storing a machine-learned model used to determine whether a notification of error information indicating an error generated in an electronic apparatus is to be made to the user, wherein the machine-learned model includes an input layer, an intermediate layer, and an output layer, has weighting coefficient information including a first weighting coefficient between the input layer and the intermediate layer and a second weighting coefficient between the intermediate layer and the output layer and the first and second weighting coefficients are set based on training with a data set in which the condition for the notification of error information is associated with the error information, operation information indicating an operation state of the electronic apparatus, and action information indicating the user action performed in response to a notification of the error information, wherein the error information includes outline information which is information included in the notification of the error information and detailed information which is larger than the outline information in amount such that the detailed information allows the user to view the error information in detail, and wherein the action information includes evaluation information obtained from the user which indicates an evaluation of the notification including whether or not the user considered the notification to be useful to the user the action information includes browsing information which indicates whether or not the user accessed the detailed information from the outline information of the error information; and causes a computer to receive the error information and the operation information as inputs, input at least the operation information in the input layer, perform a calculation based on the set weighting coefficient information, and output data indicating a result of a determination as to whether the notification of the error information is to be made to the user from the output layer.

* * * * *